US011451328B2

(12) United States Patent
Jo et al.

(10) Patent No.: US 11,451,328 B2
(45) Date of Patent: *Sep. 20, 2022

(54) METHOD FOR DETERMINING SLOT FORMAT OF USER EQUIPMENT IN WIRELESS COMMUNICATION SYSTEM AND USER EQUIPMENT USING THE SAME

(71) Applicant: LG Electronics Inc., Seoul (KR)

(72) Inventors: Soonki Jo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

This patent is subject to a terminal disclaimer.

(21) Appl. No.: 16/998,510

(22) Filed: Aug. 20, 2020

(65) Prior Publication Data

US 2020/0382237 A1 Dec. 3, 2020

Related U.S. Application Data

(63) Continuation of application No. 16/378,016, filed on Apr. 8, 2019, now Pat. No. 10,778,368.

(60) Provisional application No. 62/653,569, filed on Apr. 6, 2018.

(51) Int. Cl.
*H04W 56/00* (2009.01)
*H04L 1/00* (2006.01)
*H04L 27/26* (2006.01)
*H04W 72/04* (2009.01)
*H04W 88/02* (2009.01)
(Continued)

(52) U.S. Cl.
CPC ............ *H04L 1/003* (2013.01); *H04L 5/0094* (2013.01); *H04L 27/2607* (2013.01); *H04W 72/0446* (2013.01); *H04W 76/27* (2018.02); *H04W 88/023* (2013.01); *H04L 5/0007* (2013.01)

(58) Field of Classification Search
CPC ... H04L 1/003; H04L 5/0094; H04L 27/2607; H04L 5/0007; H04W 76/27; H04W 72/0446; H04W 88/023
USPC ......................................................... 370/329
See application file for complete search history.

(56) References Cited

U.S. PATENT DOCUMENTS 9,065,712 B2   6/2015  Lee et al.
9,380,473 B2   6/2016  Dahiya et al.
2012/0076071 A1 3/2012  Kim et al.
(Continued)

OTHER PUBLICATIONS

Huawei, HiSilicon, "Discussion and TP on slot format for ECP", R1-1802702, 3GPP TSG RAN WG1 Meeting #92, Athens, Greece, Feb. 26-Mar. 2, 2018, 8 pages.
(Continued)

*Primary Examiner* — Sai Ming Chan
(74) *Attorney, Agent, or Firm* — Fish & Richardson P.C.

(57) ABSTRACT

A method of determining a slot format in a wireless communication system, where the method is performed by a user equipment (UE) and includes: receiving, from a network, slot format information informing a first slot format for a plurality of normal symbols that are arranged within a period of time, wherein each of the plurality of normal symbols includes a normal cyclic prefix (CP). The method further includes: based on the received slot format information informing the first slot format, determining a second slot format for a plurality of extended symbols that are arranged within the period of time, wherein each of the plurality of extended symbols includes an extended CP.

12 Claims, 22 Drawing Sheets

(51) Int. Cl.
*H04W 76/27* (2018.01)
*H04L 5/00* (2006.01)

(56) References Cited

U.S. PATENT DOCUMENTS

| | | |
|---|---|---|
| 2012/0327895 A1 | 12/2012 | Wallen et al. |
| 2013/0156120 A1 | 6/2013 | Josiem et al. |
| 2013/0258913 A1 | 10/2013 | Challa et al. |
| 2014/0008611 A1 | 1/2014 | Geim et al. |
| 2014/0056188 A1 | 2/2014 | Yang et al. |
| 2014/0086111 A1 | 3/2014 | Li et al. |
| 2015/0092691 A1 | 4/2015 | Hwang et al. |
| 2015/0305021 A1 | 10/2015 | Yang et al. |
| 2016/0028533 A1 | 1/2016 | Kazmi et al. |
| 2016/0212721 A1 | 7/2016 | Sheng et al. |
| 2017/0034817 A1 | 2/2017 | Park et al. |
| 2017/0048038 A1 | 2/2017 | Seo et al. |
| 2017/0118055 A1 | 4/2017 | Guey et al. |
| 2017/0118745 A1 | 4/2017 | Nogami et al. |
| 2017/0223702 A1* | 8/2017 | Yin ................. H04L 1/1887 |
| 2017/0272214 A1 | 9/2017 | Chen et al. |
| 2018/0007688 A1 | 1/2018 | Fu et al. |
| 2018/0255542 A1 | 9/2018 | Seo et al. |
| 2018/0343091 A1 | 11/2018 | Xia |
| 2019/0254024 A1* | 8/2019 | Nam ................. H04L 27/2602 |

OTHER PUBLICATIONS

LG Electronics, "Multiplexing NCP and ECP", R1-1710358, 3GPP TSG RAN WG1 Meeting Ad-Hoc, Qingdao, P.R. China, Jun. 27-30, 2017, 5 pages.

PCT International Search Report in International Patent Application No. PCT/KR2019/004162, dated Jul. 16, 2019, 3 pages.

Qualcomm Incorporated, "Offline discussion summary on remaining issues on GC-PDCCH carrying SFI", R1-1803498, 3GPP TSG RAN WG1 #92, Athens, Greece, Feb. 26-Mar. 2, 2018, 9 pages.

WILUS Inc., "Remaining issues on group-common PDCCH for NR", R2-1802934, 3GPP TSG RAN WG1 Meeting #92, Athens, Greece, Feb. 26-Mar. 2, 2018, 5 pages.

* cited by examiner

1

METHOD FOR DETERMINING SLOT FORMAT OF USER EQUIPMENT IN WIRELESS COMMUNICATION SYSTEM AND USER EQUIPMENT USING THE SAME

CROSS-REFERENCE TO RELATED APPLICATIONS

This application is a continuation of U.S. application Ser. No. 16/378,016, filed on Apr. 8, 2019, which claims the benefit pursuant to 35 U.S.C. § 119(e) of an earlier filing date and right of priority to U.S. Provisional Application No. 62/653,569, filed on Apr. 6, 2018, the contents of which are all hereby incorporated by reference herein in their entirety.

TECHNICAL FIELD

This disclosure generally relates to wireless communication.

BACKGROUND

As more communication devices utilize greater communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

SUMMARY

Implementations are disclosed that enable determining a slot format for wireless communications.

One general aspect of the present disclosure includes a method of determining a slot format in a wireless communication system, the method performed by a user equipment (UE) and including: receiving, from a network, slot format information informing a first slot format for a plurality of normal symbols that are arranged within a period of time, where each of the plurality of normal symbols includes a normal cyclic prefix (CP). The method also includes based on the received slot format information informing the first slot format, determining a second slot format for a plurality of extended symbols that are arranged within the period of time, where each of the plurality of extended symbols includes an extended CP. Other embodiments of this aspect include corresponding computer systems, apparatus, and computer programs recorded on one or more computer storage devices, each configured to perform the actions of the methods.

Implementations may include one or more of the following features. The method where the first slot format informs that each of the plurality of normal symbols is a downlink symbol type, an uplink symbol type, or a flexible symbol type. The method where the second slot format informs that each of the plurality of extended symbols is a downlink symbol type, an uplink symbol type, or a flexible symbol type. The method where determining the second slot format for the plurality of extended symbols, based on the received slot format information informing the first slot format, includes: in a state in which an extended symbol, among the plurality of extended symbols, overlaps in time with at least one normal symbol among the plurality of normal symbols, determining the extended symbol as a downlink symbol type, an uplink symbol type, or a flexible symbol type, based on whether the at least one normal symbol is the downlink symbol type, the uplink symbol type, or the flexible symbol type. The method where determining the extended symbol as the downlink symbol type, the uplink symbol type, or the flexible symbol type, based on whether the at least one normal symbol is the downlink symbol type, the uplink symbol type, or the flexible symbol type includes: based on the at least one normal symbol all being the uplink symbol type, all being the downlink symbol type, or all being the flexible symbol type, determining the extended symbol that overlaps the at least one normal symbol to be the uplink symbol type, the downlink symbol type, or the flexible symbol type, respectively, corresponding to the at least one normal symbol. The method where determining the extended symbol as the downlink symbol type, the uplink symbol type, or the flexible symbol type, based on whether the at least one normal symbol is the downlink symbol type, the uplink symbol type, or the flexible symbol type includes: based on the at least one normal symbol including the flexible symbol type, determining the extended symbol that overlaps the at least one normal symbol to be the flexible symbol type. The method where determining the extended symbol as the downlink symbol type, the uplink symbol type, or the flexible symbol type, based on whether the at least one normal symbol is the downlink symbol type, the uplink symbol type, or the flexible symbol type includes: based on the at least one normal symbol including both the uplink symbol type and the downlink symbol type, determining the extended symbol that overlaps the at least one normal symbol to be the flexible symbol type. The method where based on a type of CP for downlink being different from a type of CP for uplink, only the second slot format for the uplink or the downlink with the extended CP is determined. The method where a reference subcarrier spacing (SCS) related to the plurality of normal symbols is equal to a reference SCS related to the plurality of extended symbols. The method where a reference SCS related to the plurality of normal symbols is smaller than a reference SCS related to the plurality of extended symbols, and where determining the second slot format for the plurality of extended symbols, based on the received slot format information informing the first slot format, includes: based on at least one extended symbol being included within a duration of a normal symbol, determining the at least one extended symbol to be of a same symbol type as the including normal symbol. The method where the first slot format is one of a plurality of first slot formats. Implementations of the described techniques may include hardware, a method or process, or computer software on a computer-accessible medium.

Another general aspect of the present disclosure includes a user equipment (UE), including: a transceiver. The user equipment also includes at least one processor, and at least one computer memory operably connectable to the at least one processor and storing instructions that, when executed by the at least one processor, perform operations including: receiving, through the transceiver and from a network, slot format information informing a first slot format for a plurality of normal symbols that are arranged within a period of time, where each of the plurality of normal symbols includes a normal cyclic prefix (CP). The operations also include:

based on the received slot format information informing the first slot format, determining a second slot format for a plurality of extended symbols that are arranged within the period of time, where each of the plurality of extended symbols includes an extended CP. Other embodiments of this aspect include corresponding computer systems, apparatus, and computer programs recorded on one or more computer storage devices, each configured to perform the actions of the methods.

Another general aspect of the present disclosure includes at least one computer-readable storage media storing instructions that, when executed by at least one processor, perform operations including: receiving, from a network, slot format information informing a first slot format for a plurality of normal symbols that are arranged within a period of time, where each of the plurality of normal symbols includes a normal cyclic prefix (CP). The operations also include: based on the received slot format information informing the first slot format, determining a second slot format for a plurality of extended symbols that are arranged within the period of time, where each of the plurality of extended symbols includes an extended CP.

Other embodiments of this aspect include corresponding computer systems, apparatus, and computer programs recorded on one or more computer storage devices, each configured to perform the actions of the methods.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Implementations are disclosed herein that enable determining a slot format of a user equipment (UE) in a wireless communication system.

According to some implementations of the present disclosure, a resource direction (e.g., uplink, downlink, and so on) may be configured per symbol, in a time domain. In the frequency domain, a plurality of subcarrier spacings may be implemented. In some scenarios, a time-based length of one symbol may vary in accordance with the subcarrier spacing. For example, larger subcarrier spacing may generally correspond to shorter symbol durations, and smaller subcarrier spacing may generally correspond to longer symbol durations. However, even for symbols having the same subcarrier spacing, the duration of the symbols may vary in accordance with type of a cyclic prefix (CP) that is included in the symbols. In particular, a symbol may include a normal CP (NCP) or an extended CP (ECP).

In some scenarios, a UE may receive configuration information for resource directions (e.g., uplink, downlink, etc.) based on a NCP, but the UE may actually be configured for ECP. In such scenarios, problems may arise if the NCP symbol duration is different from the ECP symbol duration.

Implementations are disclosed herein that enable a UE to determine resource directions (e.g., uplink, downlink, etc.) for ECP symbols based on resource direction configuration information for NCP symbols.

In some scenarios, flexibility may be an important design consideration for supporting various services in a wireless communication system. Characteristically, when naming a scheduling unit as a slot, a structure in which any slot may be dynamically changed to a physical downlink shared channel (PDSCH) transmission slot (hereinafter, DL slot) or a physical uplink shared channel (PUSCH) transmission slot (hereinafter, UL slot) will be supported. Here, PDSCH is a physical channel for transmitting DL data and PUSCH is a physical channel for transmitting UL data. Hereinafter, the structure may be referred to as a dynamic DL/UL configuration. When the dynamic DL/UL configuration is supported in the NR system, a physical channel PUCCH transmitting hybrid automatic repeat request-acknowledgement (HARQ-ACK) information for the PDSCH scheduled in the DL slot and/or UL control information such as channel state information (CSI) can be transmitted in an area where UL transmission is possible.

Figure 1:
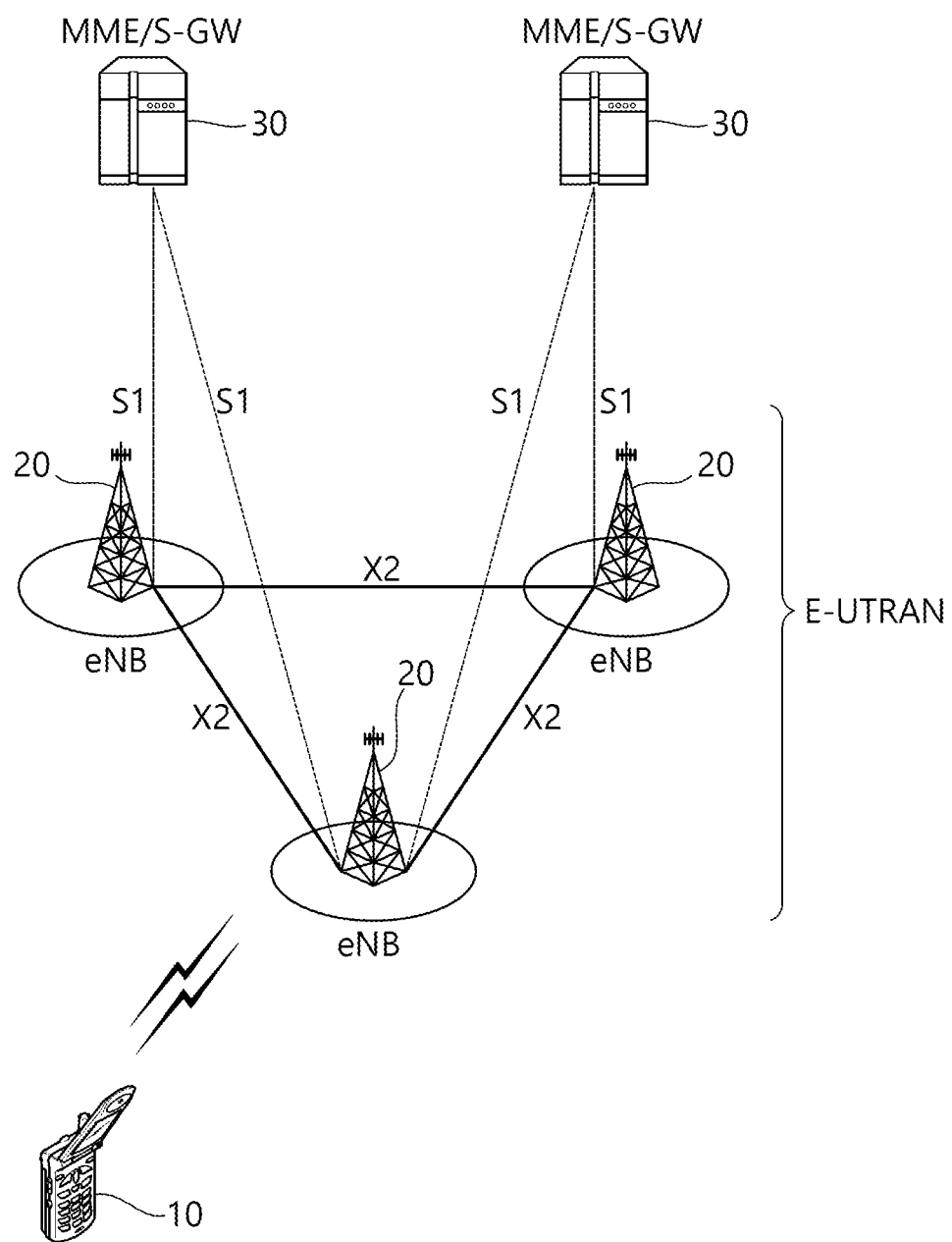
FIG. 1 shows an example of a wireless communication system according to some implementations of the present disclosure.

FIG. 1 shows an example of a wireless communication system according to some implementations of the present disclosure. In some scenarios, the wireless communication system may be compatible with one or more technical standards. For example, in some scenarios, the wireless communication system in FIG. 1 may be referred to as an Evolved-UMTS Terrestrial Radio Access Network (E-UTRAN) or a Long Term Evolution (LTE)/LTE-A system.

In this example, the E-UTRAN includes at least one base station (BS) 20 which provides a control plane and a user plane to a user equipment (UE) 10. The UE 10 may be fixed or mobile, and may be referred to by another terminology, such as a mobile station (MS), a user terminal (UT), a subscriber station (SS), a mobile terminal (MT), a wireless device, etc. The BS 20 is generally a fixed station that communicates with the UE 10 and may be referred to by another terminology, such as an evolved node-B (eNB), a base transceiver system (BTS), an access point, etc.

The BSs 20 may be interconnected by an interface, such as an X2 interface. The BSs 20 may also be connected by an interface, such as an S1 interface, to an evolved packet core (EPC) 30. For example, in some implementations, the BSs 20 may be connected to a mobility management entity (MME) through an interface, such as an S1-MME interface, and to a serving gateway (S-GW) through another interface, such as an S1-U interface.

In some implementations, the EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface protocol may be implemented between the UE and the network. Layers of the radio interface protocol between the UE and the network may be classified into a first layer (L1), a second layer (L2), and a third layer (L3), for example, based on the lower three layers of the open system interconnection (OSI) model. Among these, a physical (PHY) layer belonging to the first layer provides an information transfer service by using a physical channel, and a radio resource control (RRC) layer belonging to the third layer serves to control a radio resource between the UE and the network. In some implementations, the RRC layer exchanges an RRC message between the UE and the BS.

Figure 2:
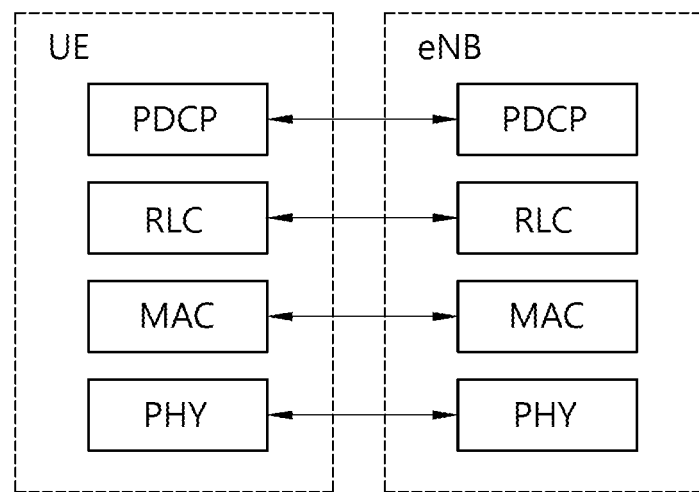
FIG. 2 is a diagram showing an example of a wireless protocol architecture for a user plane.
Figure 3:
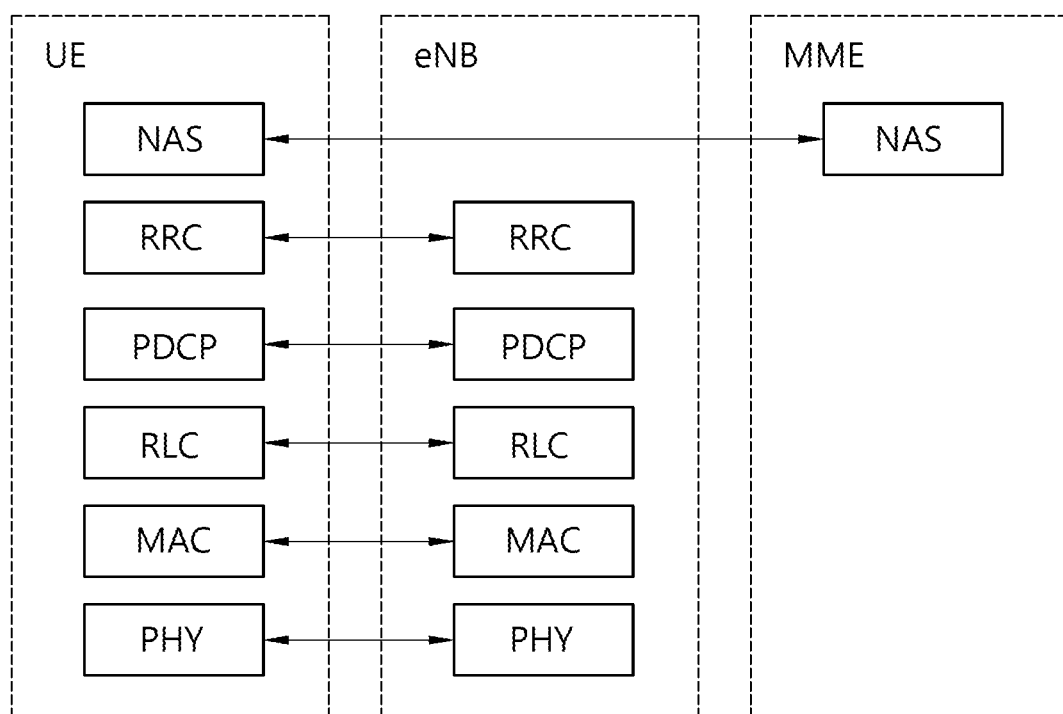
FIG. 3 is a diagram showing an example of a wireless protocol architecture for a control plane.

FIG. 2 is a diagram showing an example of a wireless protocol architecture for a user plane. FIG. 3 is a diagram showing an example of a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer, which is an upper layer of the PHY layer, through a transport channel. Data is transferred between the MAC layer and the PHY layer through the transport channel. The transport channel may be classified according to how and with what characteristics data is transferred through a radio interface.

Data is transferred between different PHY layers, for example, between PHY layers of a transmitter and a receiver, through a physical channel. The physical channel may be modulated according to a suitable modulation techniques, e.g., Orthogonal Frequency Division Multiplexing (OFDM), using time and frequency as radio resources.

The functions of the MAC layer include, for example, mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include, for example, concatenation, segmentation, and reassembly of an RLC SDU. In some scenarios, to guarantee various types of Quality of Service (QoS) required by a Radio Bearer (RB), the RLC layer provides three types of operation modes: Transparent Mode (TM), Unacknowledged Mode (UM), and Acknowledged Mode (AM). Among these, in some implementations, AM RLC provides error correction through an Automatic Repeat Request (ARQ).

The RRC layer is defined only on the control plane, according to some implementations. The RRC layer is related to, for example, the configuration, reconfiguration, and release of radio bearers, and is responsible for control of logical channels, transport channels, and PHY channels. An RB is a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes, for example, the transfer of user data and header compression and ciphering. The function of the PDCP layer on the user plane further includes, for example, the transfer and encryption/integrity protection of control plane data.

The process of configuring an RB may include defining the characteristics of a wireless protocol layer and channels in order to provide specific service and configuring each detailed parameter and operating method. An RB may be, for example, a Signaling RB (SRB) or a Data RB (DRB). The SRB is used as a passage through which an RRC message is transmitted on the control plane, and the DRB is used as a passage through which user data is transmitted on the user plane.

If an RRC connection is established between the RRC layer of UE and the RRC layer of an E-UTRAN, then the UE is referred to as being in the "RRC connected state." If not, the UE is referred to as being in the "RRC idle state."

A downlink transport channel through which data is transmitted from a network to UE includes, for example, a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). In some implementations, an uplink transport channel through which data is transmitted from UE to a network includes, for example, a random access channel (RACH) through which an initial control message is transmitted and an uplink shared channel (SCH) through which user traffic or control messages are transmitted.

Logical channels that are implemented over the transport channel, and that are mapped to the transport channel, include, for example, a broadcast control channel (BCCH), a paging control channel (PCCH), a common control channel (CCCH), a multicast control channel (MCCH), and a multicast traffic channel (MTCH).

The physical channel includes several symbols (e.g., OFDM symbols) in the time domain and several subcarriers in the frequency domain. One subframe includes a plurality of OFDM symbols in the time domain. An RB is a unit of resource allocation for the communication system, and includes a plurality of OFDM symbols in the time domain and a plurality of subcarriers in the frequency domain. In some implementations, for each subframe, specific subcarriers of specific OFDM symbols (e.g., the first OFDM symbol) of the corresponding subframe may be allocated for a physical downlink control channel (PDCCH), e.g., an L1/L2 control channel. A Transmission Time Interval (TTI) is a unit of time for a single subframe transmission.

Figure 4:
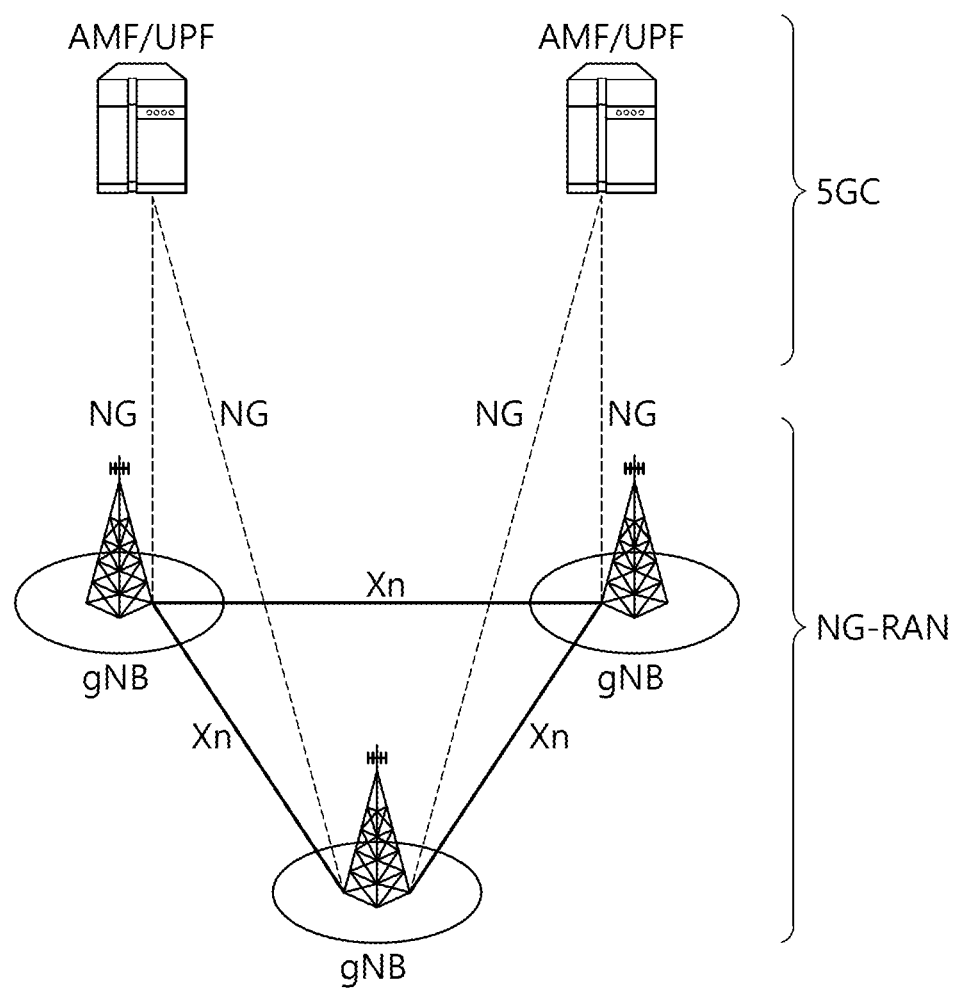
FIG. 4 illustrates an example of a system structure of a next generation radio access network (NG-RAN) according to some implementations of the present disclosure.

FIG. 4 illustrates a system structure of a next generation radio access network (NG-RAN) according to some implementations of the present disclosure.

Referring to the example of FIG. 4, the NG-RAN may include a gNB and/or an eNB that provides user plane and control plane protocol termination to a terminal. The example of FIG. 4 illustrates the case of including only gNBs, but implementations are not limited thereto. The gNB and the eNB are connected by an interface, such as an Xn interface. The gNB and the eNB are connected to a 5G core network (5GC) via an interface, such as an NG interface. In some implementations, the gNB and the eNB are connected to an access and mobility management function (AMF) via an interface, such as an NG-C interface, and are connected to a user plane function (UPF) via another interface, such as an NG-U interface.

Figure 5:
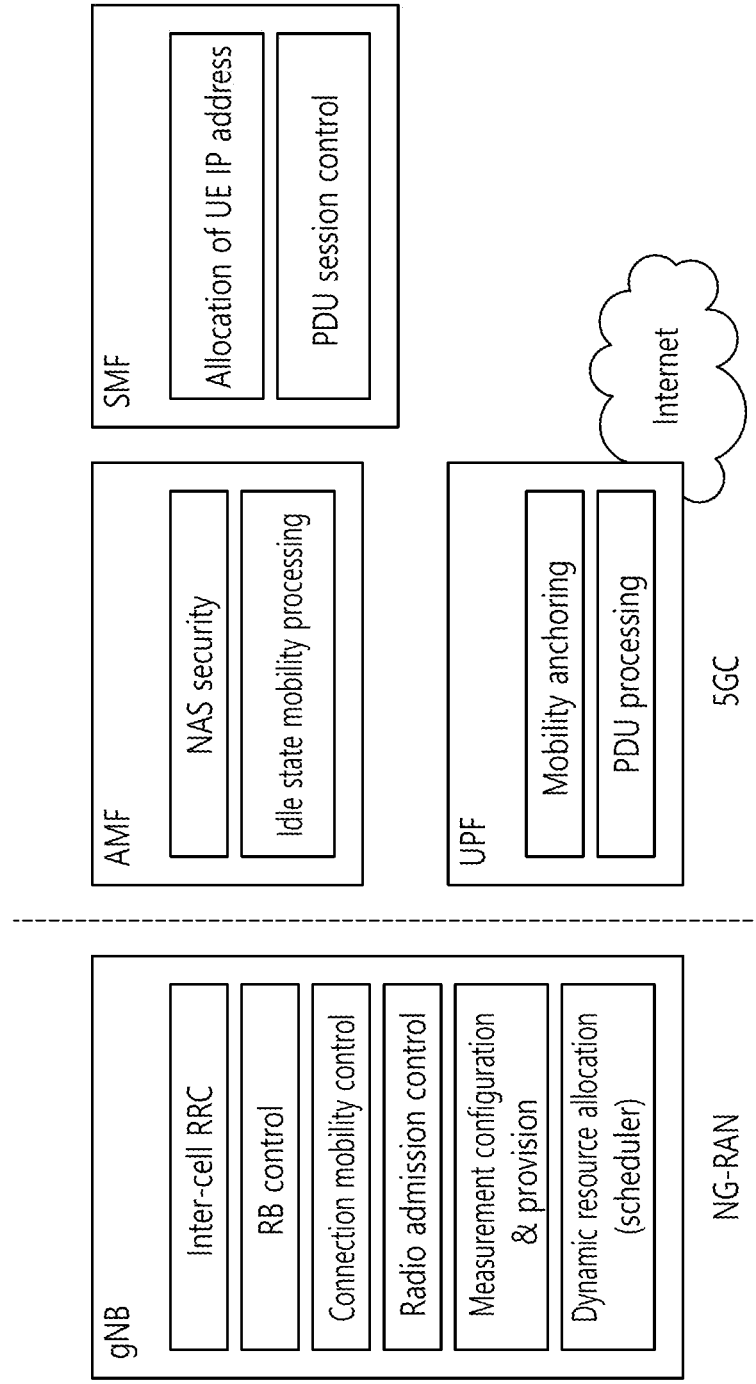
FIG. 5 illustrates an example of a functional division that may be implemented between an NG-RAN and a 5G core (5GC)

FIG. 5 illustrates an example of a functional division that may be implemented between an NG-RAN and a 5GC.

According to some implementations, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
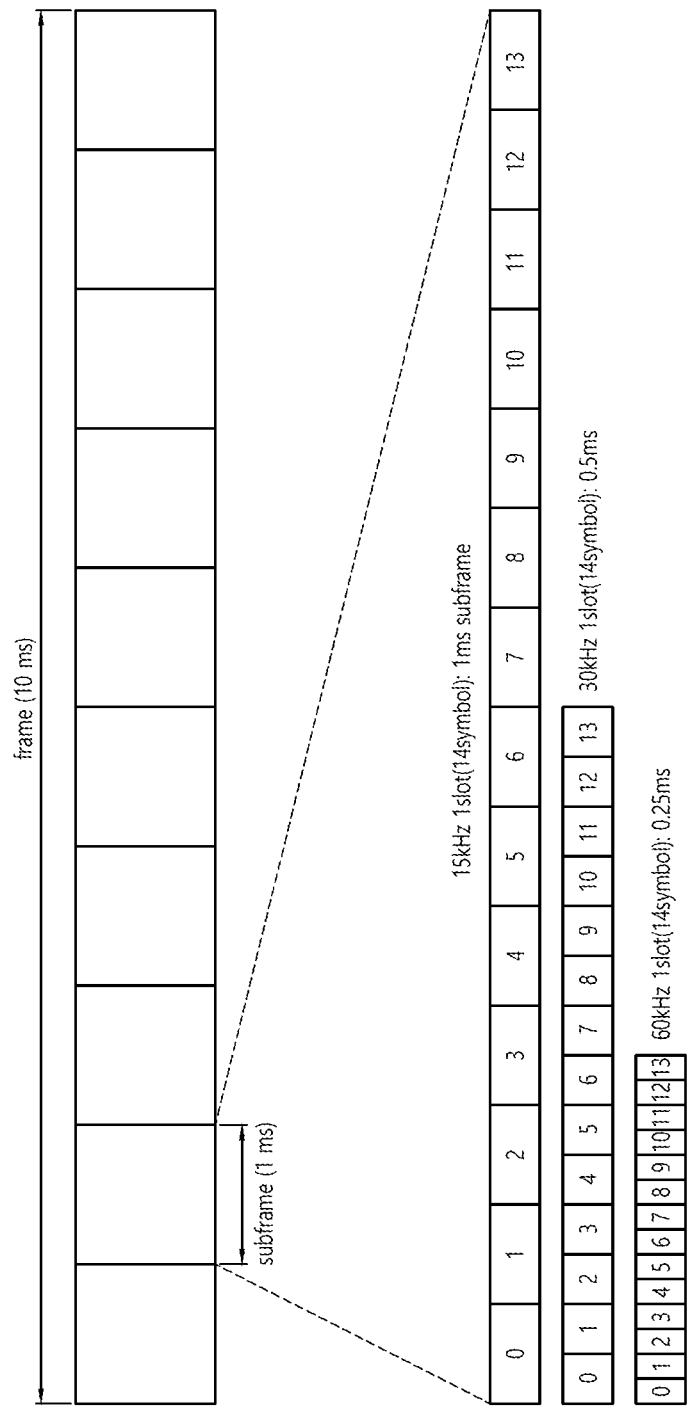
FIG. 6 illustrates an example of a frame structure according to some implementations of the present disclosure.

FIG. 6 illustrates an example of a frame structure according to some implementations of the present disclosure. For example, the frame structure of FIG. 6 may be utilized in implementations that are compatible with NR.

Referring to the example of FIG. 6, a frame may be composed of 10 milliseconds (ms) and include 10 subframes each composed of 1 ms.

One or a plurality of slots may be included in a subframe according to subcarrier spacings.

The following Table 1 illustrates an example of a subcarrier spacing configuration $\mu$.

TABLE 1

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The following Table 2 illustrates an example of the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, the example of subcarrier spacing $\mu=0, 1, 2$ is illustrated.

A physical downlink control channel (PDCCH) may include one or more control channel elements (CCEs) as illustrated in the example shown in the following Table 3.

TABLE 3

| Aggregation level | Number of CCEs |
|---|---|
| 1 | 1 |
| 2 | 2 |
| 4 | 4 |
| 8 | 8 |
| 16 | 16 |

As shown in this example, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

In some implementations, a resource unit called a control resource set (CORESET) may be introduced. The terminal may receive the PDCCH in the CORESET.

Figure 7:
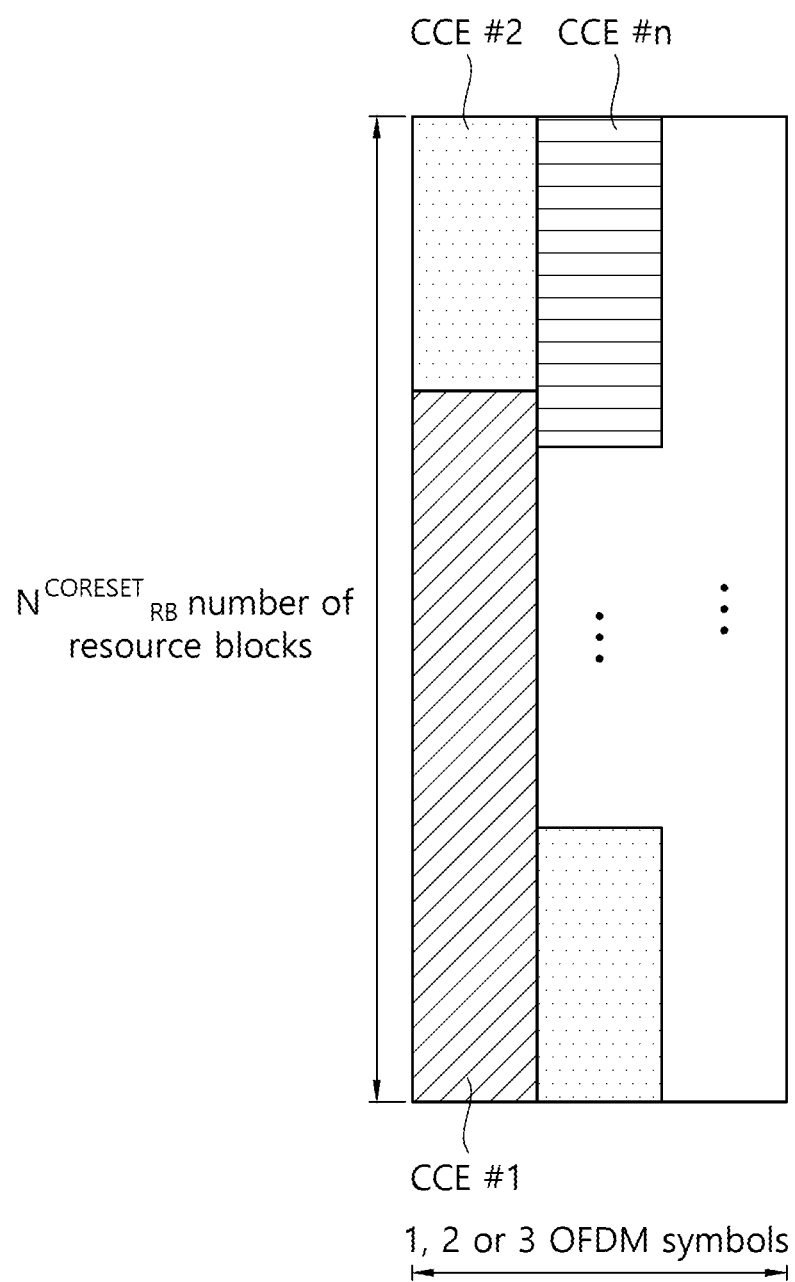
FIG. 7 illustrates an example of a control resource set (CORESET) according to some implementations of the present disclosure.

FIG. 7 illustrates an example of a CORESET according to some implementations of the present disclosure.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided, for example, by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
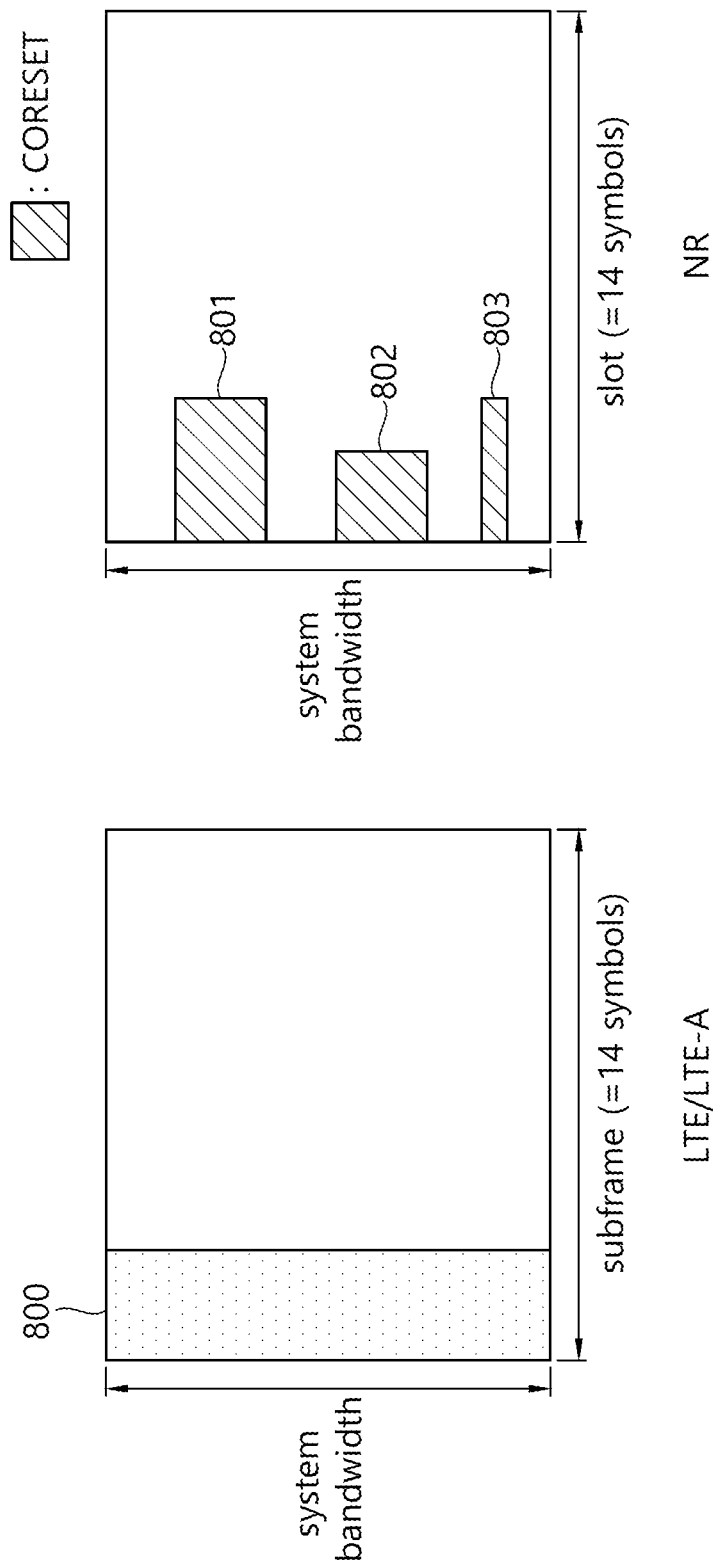
FIG. 8 is a diagram illustrating an example of a comparison between a control region that may be implemented in some communication systems, and a CORESET that may be implemented in some communication systems.

FIG. 8 is a diagram illustrating an example of a comparison between a control region that may be implemented in some communication systems, and a CORESET that may be implemented in some communication systems.

Referring to the example of FIG. 8, a control region 800 in some wireless communication systems (e.g., systems compatible with LTE/LTE-A) is configured over the entire system band used by a base station (BS). Therefore, in such systems, all the terminals, excluding some (e.g., eMTC/NB-IoT terminal) that support only a narrow band, must be able to receive wireless signals on the entire system band of the BS, in order to properly receive/decode control information transmitted by the BS.

On the other hand, in some communication systems (e.g., systems that are compatible with NR), a CORESET may be implemented, as described above. In the example of FIG. 8, CORESETs 801, 802, and 803 are radio resources for control information to be received by the terminal. Each of the CORESETS 801, 802, and 803 may use only a portion of the system bandwidth, rather than each using the entirety of the system bandwidth. The BS may allocate a particular CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. As such, a terminal may receive control information from the BS without necessarily receiving the entire system band.

In some implementations of the present disclosure, a CORESET may be implemented that includes (i) a UE-specific CORESET for transmitting UE-specific control information and (ii) a common CORESET for transmitting control information common to all UEs.

In some scenarios, a wireless communication system may be implemented for applications that require high reliability. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In some implementations of the present disclosure, the following technologies/features can be applied. These technologies/features may be compliant with NR.

Self-Contained Subframe Structure

Figure 9:
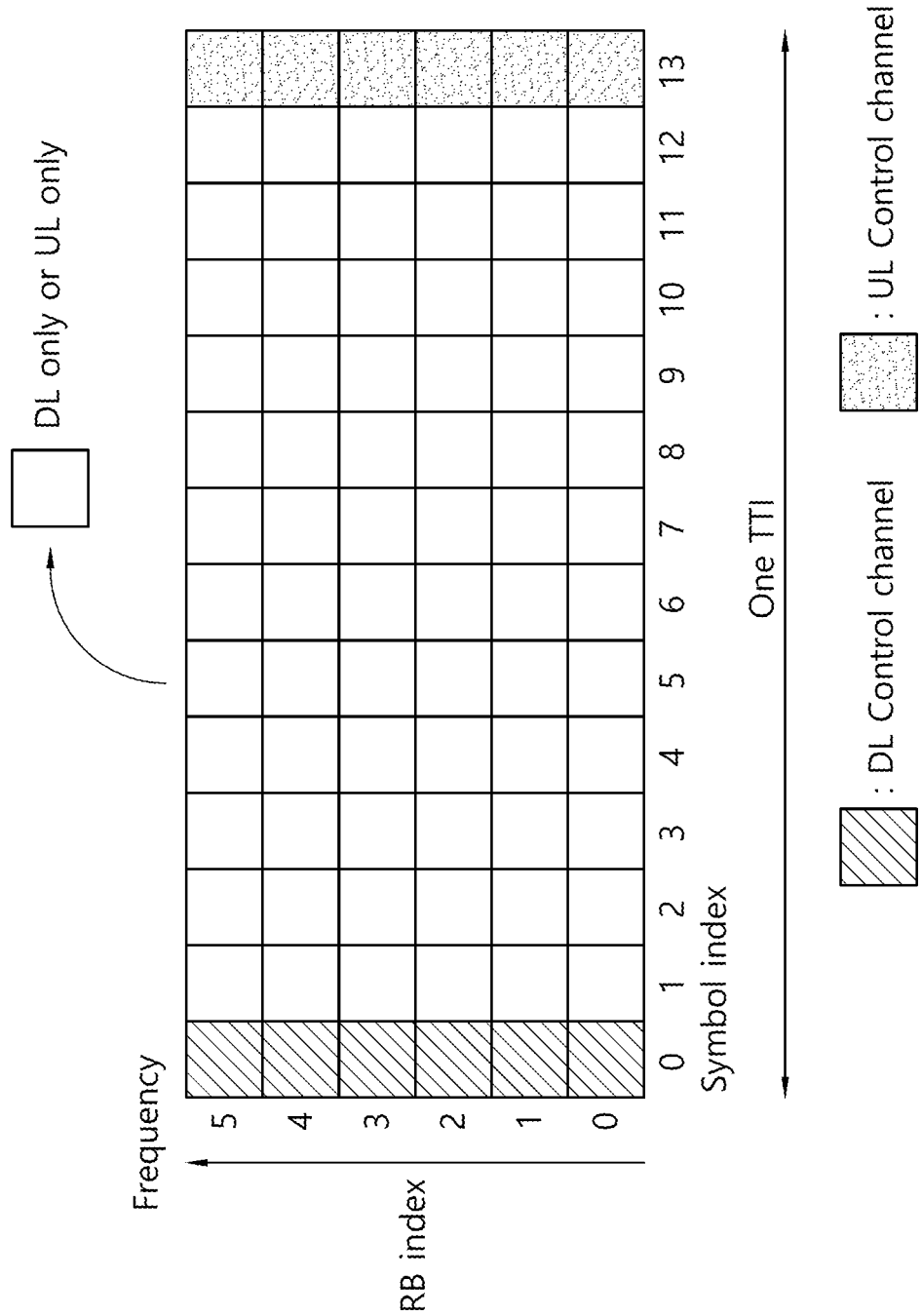
FIG. 9 illustrates an example of a frame structure according to some implementations of the present disclosure.

FIG. 9 illustrates an example of a frame structure according to some implementations of the present disclosure. This frame structure may, for example, by compatible with new radio access technology.

In NR, a structure in which a control channel and a data channel are time-division-multiplexed within one TTI, as shown in FIG. 9, may be implemented as a frame structure. Such frame structure implementations can, in some scenarios, help reduce latency.

In the example of FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, in some scenarios, a time period from an occurrence of a data transmission error to a data retransmission may be reduced, thereby reducing latency in data transmission.

In this data and control time-division multiplexed (TDMed) subframe structure, a time gap may be implemented, for a base station and a terminal to switch from a transmission mode to a reception mode or from the reception mode to the transmission mode. To this end, some OFDM symbols at a time when DL switches to UL may be set to a guard period (GP) in the self-contained subframe structure.

Analog beamforming #1

In some implementations, wavelengths are shortened in millimeter wave (mmW) and thus a large number of antenna elements can be installed in the same area. For example, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, some implementations may utilize techniques for mapping a large number of antenna elements to one TXRU and controlling a beam direction using an analog phase shifter. Such analog beamforming can form only one beam direction in all bands and thus cannot provide frequency selective beamforming.

In some scenarios, hybrid beamforming (BF) having a number B of TXRUs which is smaller than Q antenna elements may be implemented as an intermediate form of digital BF and analog BF. In this case, the number of directions of beams which can be simultaneously transmitted are limited to B although it depends on a method of connecting the B TXRUs and the Q antenna elements.

Analog beamforming #2

In scenarios where a plurality of antennas is implemented, hybrid beamforming which is a combination of digital beamforming and analog beamforming may be utilized. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
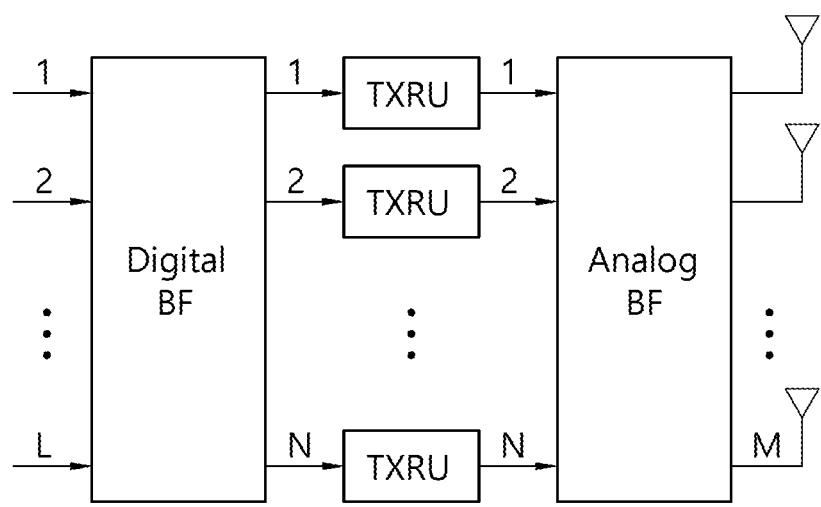
FIG. 10 is a diagram illustrating an example of hybrid beamforming from the viewpoint of TXRUs and physical antennas.

FIG. 10 is a diagram illustrating an example of hybrid beamforming from the viewpoint of TXRUs and physical antennas, according to some implementations of the present disclosure.

In the example of FIG. 10, the number of digital beams is L and the number of analog beams is N. Further, in some scenarios (e.g., systems that are compatible with NR), by designing the base station to change the analog beamforming in units of symbols, the system may support more efficient beamforming for a terminal located in a specific area. Furthermore, when defining N TXRUs and M RF antennas as one antenna panel, a plurality of antenna panels may be implemented to which independent hybrid beamforming is applicable.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities may be implemented.

Figure 11:
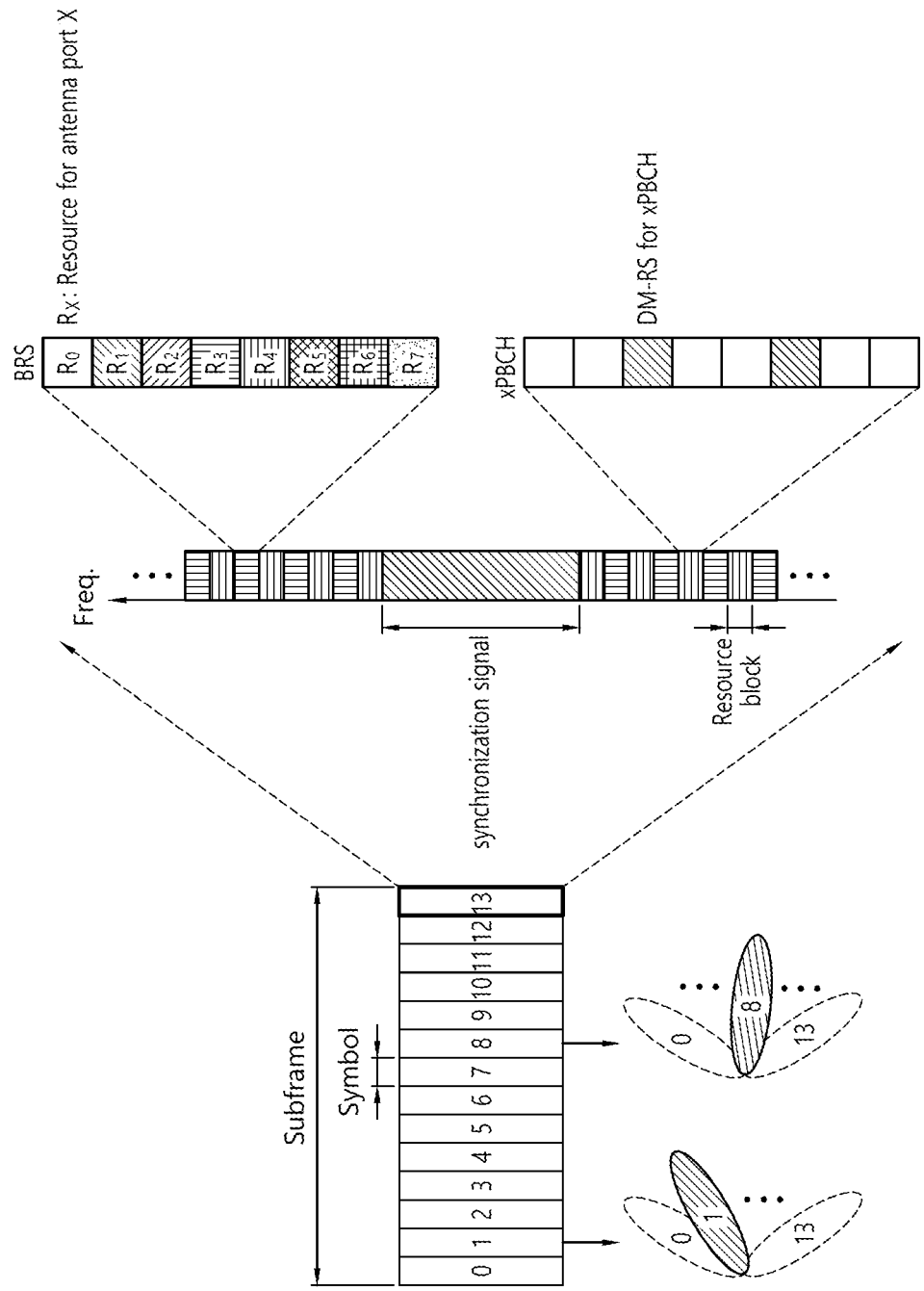
FIG. 11 illustrates an example of a beam sweeping operation for a synchronization signal and system information in a downlink (DL) transmission procedure.

FIG. 11 illustrates an example of a beam sweeping operation for a synchronization signal and system information in a downlink (DL) transmission procedure.

In the example of FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam may be implemented. The BRS can be defined for a plurality of antenna ports, and each antenna port of the BRS can correspond to a single analog beam. In some implementations, all analog beams in an analog beam group are applied to the synchronization signal or xPBCH and then the synchronization signal or xPBCH is transmitted such that an arbitrary terminal can successively receive the synchronization signal or xPBCH.

In some scenarios, the following rules/details may be applied to slot formats and/or the determining of slot formats. The rules/details, which will hereinafter be described in detail, may be applied to a serving cell included in a set of serving cells that are configured in a user equipment (UE).

If a UE is configured by higher layers with parameter SlotFormatIndicator, the UE is provided a SFI-RNTI by sfi-RNTI and with a payload size of DCI format 2_0 by dci-PayloadSize.

The UE is also provided in one or more serving cells with a configuration for a search space set s and a corresponding CORESET p for monitoring $M_{p,s}^{(L_{SFI})}$ PDCCH candidates for DCI format 2_0 with a CCE aggregation level of $L_{SFI}$ CCEs. The $M_{p,s}^{(L_{SFI})}$ PDCCH candidates are the first $M_{p,s}^{(L_{SFI})}$ PDCCH candidates for CCE aggregation level $L_{SFI}$ for search space set s in CORESET p.

For each serving cell in the set of serving cells, the UE can be provided as follows.
- an identity of the serving cell by servingCellId.
- a location of a SFI-index field in DCI format 2_0 by positionInDCI.
- a set of slot format combinations by slotFormatCombinations, where each slot format combination in the set of slot format combinations includes one or more slot formats indicated by a respective slotFormats for the slot format combination, and a mapping for the slot format combination provided by slotFormats to a corresponding SFI-index field value in DCI format 2_0 provided by slotFormatCombinationId.
- for unpaired spectrum operation, a reference SCS configuration $\mu_{SFI}$ by subcarrierSpacing and, when a supplementary UL carrier is configured for the serving cell, a reference SCS configuration $\mu_{SFI,\,SUL}$ by subcarrierSpacing2 for the supplementary UL carrier.
- for paired spectrum operation, a reference SCS configuration $\mu_{SFI,\,DL}$ for a DL BWP by subcarrierSpacing and a reference SCS configuration $\mu_{SFI,UL}$ for an UL BWP by subcarrierSpacing2.

A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0. The SFI-index field includes max {⌈log$_2$ (maxSFIinde x+1)⌉, 1} bits where maxSFIindex is the maximum value of the values provided by corresponding slotFormatCombinationId. A slot format is identified by a corresponding format index as provided in Table 4, below, where 'D' denotes a downlink symbol, 'U' denotes an uplink symbol, and 'F' denotes a flexible symbol.

If a PDCCH monitoring periodicity for DCI format 2_0, provided to a UE for the search space set s by monitoringSlotPeriodicityAndOffset, is smaller than a duration of a slot format combination the UE obtains at a PDCCH monitoring occasion for DCI format 2_0 by a corresponding SFI-index field value, and the UE detects more than one DCI formats 2_0 indicating a slot format for a slot, then the UE expects each of the more than one DCI formats 2_0 to indicate a same format for the slot.

A UE does not expect to be configured to monitor PDCCH for DCI format 2_0 on a second serving cell that uses larger SCS than the serving cell.

Table 4 shows an example of slot formats for a normal cyclic prefix (CP).

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |

TABLE 4-continued

| Format | \multicolumn{14}{c}{Symbol number in a slot} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | F | F | F | F | F | F | U | U | U |
| 45 | D | D | D | D | D | F | F | U | U | U | U | U | U | U |
| 46 | D | D | D | D | F | U | D | D | D | D | D | D | F | U |
| 47 | D | D | F | U | U | U | D | D | F | U | U | U | U | U |
| 48 | D | F | U | U | U | U | D | F | U | U | U | U | U | U |
| 49 | D | D | D | D | F | F | U | D | D | D | D | F | F | U |
| 50 | D | D | F | F | U | U | U | D | F | F | U | U | U | U |
| 51 | D | F | F | U | U | U | U | D | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | F | U | U | D | D | D | D | D | D | D |
| 56-254 | \multicolumn{14}{c}{Reserved} |
| 255 | \multicolumn{14}{l}{UE determines the slot format for the slot based on TDD-UL-DL-ConfigurationCommon, or TDD-UL-DL-ConfigDedicated and, if any, on detected DCI formats} |

For unpaired spectrum operation for a UE on a serving cell, the UE is provided by subcarrierSpacing a reference SCS configuration $\mu_{SFI}$ for each slot format in a combination of slot formats indicated by a SFI-index field value in DCI format 2_0. The UE expects that for a reference SCS configuration $\mu_{SFI}$ and for an active DL BWP or an active UL BWP with SCS configuration $\mu$, it is $\mu \geq \nu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP where the first slot starts at a same time as a first slot for the reference SCS configuration $\mu_{SFI}$ and each downlink or flexible or uplink symbol for the reference SCS configuration $\mu_{SFI}$ corresponds to $2^{(\mu-\mu_{SFI})}$ consecutive downlink or flexible or uplink symbols for the SCS configuration $\mu$.

For paired spectrum operation for a UE on a serving cell, the SFI-index field in DCI format 2_0 indicates a combination of slot formats that includes a combination of slot formats for a reference DL BWP and a combination of slot formats for a reference UL BWP of the serving cell. The UE is provided by subcarrierSpacing a reference SCS configuration $\mu_{SFI,DL}$ for the combination of slot formats indicated by the SFI-index field value in DCI format 2_0 for the reference DL BWP of the serving cell. The UE is provided by subcarrierSpacing2 a reference SCS configuration $\mu_{SFI,UL}$ for the combination of slot formats indicated by the SFI-index field value in DCI format 2_0 for the reference UL BWP of the serving cell. If $\mu_{SFI,DL} \geq \mu_{SFI,UL}$ and for each $2^{(\mu_{SFI,DL}-\mu_{SFI,UL})}+1$ values provided by a value of slotFormats, where the value of slotFormats is determined by a value of slotFormatCombinationId in slotFormatCombination and the value of slotFormatCombinationId is set by the value of the SFI-index field value in DCI format 2_0, the first $2^{(\mu_{SFI,DL}-\mu_{SFI,UL})}$ values for the combination of slot formats are applicable to the reference DL BWP and the next value is applicable to the reference UL BWP. If $\mu_{SFI,DL} < \mu_{SFI,UL}$ and for each $2^{(\mu_{SFI,UL}-\mu_{SFI,DL})}+1$ values provided by slotFormats, the first value for the combination of slot formats is applicable to the reference DL BWP and the next $2^{(\mu_{SFI,UL}-\mu_{SFI,DL})}$ values are applicable to the reference UL BWP.

The UE is provided a reference SCS configuration $\mu_{SFI,DL}$ so that for an active DL BWP with SCS configuration $\mu_{DL}$, it is $\mu_{DL} \geq \mu_{SFI,DL}$. The UE is provided a reference SCS configuration $\mu_{SFI,UL}$ so that for an active UL BWP with SCS configuration $\mu_{UL}$, it is $\mu_{UL} \geq \mu_{SFI,UL}$. Each slot format for a combination of slot formats indicated by the SFI-index field value in DCI format 2_0 for the reference DL BWP, by indicating a value for slotFormatCombinationId that is mapped to a value of slotFormats in slotFormatCombination, is applicable to $2^{(\mu_{DL}-\mu_{SFI,DL})}$ consecutive slots for the active DL BWP where the first slot starts at a same time as a first slot in the reference DL BWP and each downlink or flexible symbol for the reference SCS configuration $\mu_{SFI,DL}$ corresponds to $2^{(\mu_{DL}-\mu_{SFI,DL})}$ consecutive downlink or flexible symbols for the SCS configuration $\mu_{DL}$. Each slot format for the combination of slot formats for the reference UL BWP is applicable to $2^{(\mu_{UL}-\mu_{SFI,UL})}$ consecutive slots for the active UL BWP where the first slot starts at a same time as a first slot in the reference UL BWP and each uplink or flexible symbol for the reference SCS configuration $\mu_{SFI,UL}$ corresponds to $2^{(\mu_{UL}-\mu_{SFI,UL})}$ consecutive uplink or flexible symbols for the SCS configuration $\mu_{UL}$.

For unpaired spectrum operation with a second UL carrier for a UE on a serving cell, the SFI-index field value in DCI format 2_0 indicates a combination of slot formats that includes a combination of slot formats for a reference first UL carrier of the serving cell and a combination of slot formats for a reference second UL carrier of the serving cell. The UE is provided by subcarrierSpacing a reference SCS configuration $\mu_{SFI}$ for the combination of slot formats indicated by the SFI-index field in DCI format 2_0 for the reference first UL carrier of the serving cell. The UE is provided by subcarrierSpacing2 a reference SCS configuration $\mu_{SFI,SUL}$ for the combination of slot formats indicated by the SFI-index field value in DCI format 2_0 for the reference second UL carrier of the serving cell. For each $2^{(\mu_{SFI}-\mu_{SFI,SUL})}+1$ values of slotFormats, the first $2^{(\mu_{SFI}-\mu_{SFI,SUL})}$ values for the combination of slot formats are applicable to the reference first UL carrier and the next value is applicable to the reference second UL carrier.

The UE expects to be provided a reference SCS configuration $\mu_{SFI,SUL}$ so that for an active UL BWP in the second UL carrier with SCS configuration $\mu_{SUL}$, it is $\mu_{UL} \geq \mu_{SFI,SUL}$. Each slot format for a combination of slot formats indicated by the SFI-index field in DCI format 2_0 for the reference first UL carrier is applicable to $2^{(\mu-\mu_{SFI})}$ consecutive slots for the active DL BWP and the active UL BWP in the first UL carrier where the first slot starts at a same time as a first slot in the reference first UL carrier. Each slot format for the combination of slot formats for the reference second UL carrier is applicable to $2^{(\mu_{SUL}-\mu_{SFI,SUL})}$ consecutive slots for the active UL BWP in the second UL carrier where the first slot starts at a same time as a first slot in the reference second UL carrier.

If a BWP in the serving cell is configured with $\mu=2$ and with extended CP, the UE expects $\mu_{SFI}=0$, $\mu_{SFI}=1$, or $\mu_{SFI}=2$. A format for a slot with extended CP is determined from a format for a slot with normal CP. A UE determines an extended CP symbol to be a downlink/uplink/flexible symbol if the overlapping normal CP symbols that are downlink/uplink/flexible symbols, respectively. A UE determines an extended CP symbol to be a flexible symbol if one of the overlapping normal CP symbols is flexible. A UE determines an extended CP symbol to be a flexible symbol if the pair of the overlapping normal CP symbols includes a downlink and an uplink symbol.

A reference SCS configuration $\mu_{SFI}$, or $\mu_{SFI,DL}$ or $\mu_{SFI,UL}$, or $\mu_{SFI,SUL}$ is either 0, or 1, or 2 for FR1 and is either 2 or 3 for FR2. Here, FR1 may denote a frequency band of 6 GHz or less, and FR2 may denote a millimeter wave (mm-wave).

For a set of symbols of a slot, a UE does not expect to detect a DCI format 2_0 with an SFI-index field value indicating the set of symbols of the slot as uplink and to detect a DCI format 1_0, a DCI format 1_1, or DCI format 0_1 indicating to the UE to receive PDSCH or CSI-RS in the set of symbols of the slot.

For a set of symbols of a slot, a UE does not expect to detect a DCI format 2_0 with an SFI-index field value indicating the set of symbols in the slot as downlink and to detect a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot.

For a set of symbols of a slot that are indicated as downlink/uplink by TDD-UL-DL-ConfigurationCommon, or TDD-UL-DL-ConfigDedicated, the UE does not expect to detect a DCI format 2_0 with an SFI-index field value indicating the set of symbols of the slot as uplink/downlink, respectively, or as flexible.

For a set of symbols of a slot indicated to a UE by ssb-PositionsInBurst in SystemInformationBlockType1 or ssb-PositionsInBurst in ServingCellConfigCommon for reception of SS/PBCH blocks, the UE does not expect to detect a DCI format 2_0 with an SFI-index field value indicating the set of symbols of the slot as uplink.

For a set of symbols of a slot indicated to a UE by prach-ConfigurationIndex in RACH-ConfigCommon for PRACH transmissions, the UE does not expect to detect a DCI format 2_0 with an SFI-index field value indicating the set of symbols of the slot as downlink.

For a set of symbols of a slot indicated to a UE by pdcch-ConfigSIB1 in MIB for a CORESET for Type0-PDCCH CSS set, the UE does not expect to detect a DCI format 2_0 with an SFI-index field value indicating the set of symbols of the slot as uplink.

For a set of symbols of a slot indicated to a UE as flexible by TDD-UL-DL-ConfigurationCommon and TDD-UL-DL-ConfigDedicated, or when TDD-UL-DL-ConfigurationCommon and TDD-UL-DL-ConfigDedicated are not provided to the UE, and if the UE detects a DCI format 2_0 providing a format for the slot using a slot format value other than 255 if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols if an SFI-index field value in DCI format 2_0 indicates the set of symbols of the slot as flexible and the UE detects a DCI format 1_0, DCI format 1_1, or DCI format 0_1 indicating to the UE to receive PDSCH or CSI-RS in the set of symbols of the slot, the UE receives PDSCH or CSI-RS in the set of symbols of the slot if an SFI-index field value in DCI format 2_0 indicates the set of symbols of the slot as flexible and the UE detects a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot the UE transmits the PUSCH, PUCCH, PRACH, or SRS in the set of symbols of the slot if an SFI-index field value in DCI format 2_0 indicates the set of symbols of the slot as flexible, and the UE does not detect a DCI format 1_0, DCI format 1_1, or DCI format 0_1 indicating to the UE to receive PDSCH or CSI-RS, or the UE does not detect a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot, the UE does not transmit or receive in the set of symbols of the slot if the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink if the UE is configured by higher layers to transmit SRS in the set of symbols of the slot, the UE transmits the SRS only in a subset of symbols from the set of symbols of the slot indicated as uplink symbols by an SFI-index field value in DCI format 2_0 a UE does not expect to detect an SFI-index field value in DCI format 2_0 indicating the set of symbols of the slot as downlink and also detect a DCI format 0_0, DCI format 0_1, DCI format 1_0, DCI format 1_1, DCI format 2_3, or a RAR UL grant indicating to the UE to transmit SRS, PUSCH, PUCCH, or PRACH, in one or more symbols from the set of symbols of the slot a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH a UE does not expect to detect an SFI-index field value in DCI format 2_0 indicating the set of symbols of the slot as uplink and also detect a DCI format 1_0 or DCI format 1_1 or DCI format 0_1 indicating to the UE to receive PDSCH or CSI-RS in one or more symbols from the set of symbols of the slot If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format 0_0, DCI format 0_1, DCI format 1_0, DCI format 1_1, or DCI format 2_3 indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format 1_0, DCI format 1_1, or DCI format 0_1 indicating to the UE to receive CSI-RS or PDSCH in a subset of symbols from the set of symbols, then the UE does not expect to cancel the transmission in symbols from the subset of symbols that occur, relative to a last symbol of a CORESET where the UE detects the DCI format 2_0 or the DCI format 1_0 or the DCI format 1_1 or the DCI format 0_1, after a number of symbols that is smaller than the PUSCH preparation time $T_{proc,2}$ for the corresponding PUSCH processing capability.

the UE cancels the PUCCH, or PUSCH, or PRACH transmission in remaining symbols from the set of symbols and cancels the SRS transmission in remaining symbols from the subset of symbols.

A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format 0_0, DCI format 0_1, DCI format 1_0, DCI format 1_1, or DCI format 2_3 indicating to the UE to transmit SRS, PUSCH, PUCCH, or PRACH in the set of symbols.

For a set of symbols of a slot that are indicated as flexible by TDD-UL-DL-ConfigurationCommon, and TDD-UL-DL-ConfigDedicated, or when TDD-UL-DL-ConfigurationCommon, and TDD-UL-DL-ConfigDedicated are not provided to the UE, and if the UE does not detect a DCI format 2_0 providing a slot format for the slot the UE receives PDSCH or CSI-RS in the set of symbols of the slot if the UE receives a corresponding indication by a DCI format 1_0, DCI format 1_1, or DCI format 0_1 the UE transmits PUSCH, PUCCH, PRACH, or SRS in the set of symbols of the slot if the UE receives a corresponding indication by a DCI format 0_0, DCI format 0_1, DCI format 1_0, DCI format 1_1, or DCI format 2_3 the UE receives PDCCH if the UE is configured by higher layers to receive PDSCH or CSI-RS in the set of symbols of the slot, the UE does not receive the PDSCH or the CSI-RS in the set of symbols of the slot if the UE is configured by higher layers to transmit SRS, or PUCCH, or PUSCH, or PRACH in the set of symbols of the slot, the UE does not transmit the PUCCH, or the PUSCH, or the PRACH in the slot and does not transmit the SRS in symbols from the set of symbols in the slot, if any, starting from a symbol that is a number of symbols equal to the PUSCH preparation time $N_2$ for the corresponding PUSCH timing capability after a last symbol of a CORESET where the UE is configured to monitor PDCCH for DCI format 2_0 and does not expect to cancel the transmission of the SRS, or the PUCCH, or the PUSCH, or the PRACH in symbols from the set of symbols in the slot, if any, starting before a symbol that is a number of symbols equal to the PUSCH preparation time $N_2$ for the corresponding PUSCH timing capability after a last symbol of a CORESET where the UE is configured to monitor PDCCH for DCI format 2_0

For unpaired spectrum operation for a UE on a cell in a frequency band of FR1, and when the scheduling restrictions due to RRM measurements are not applicable, if the UE detects a DCI format 0_0, DCI format 0_1, DCI format 1_0, DCI format 1_1, or DCI format 2_3 indicating to the UE to transmit in a set of symbols, the UE is not required to perform RRM measurements based on a SS/PBCH block or CSI-RS reception on a different cell in the frequency band if the SS/PBCH block or CSI-RS reception includes at least one symbol from the set of symbols.

In some implementations of the present disclosure, as described above, resource directions (e.g., uplink, downlink, etc.) may be configured in symbol units. Additionally, in the NR, multiple subcarrier spacings each being different from one another are defined, and, accordingly, a time-based length of one symbol may vary in accordance with the subcarrier spacing. Additionally, the length of symbols having the same subcarrier spacing may vary in accordance with a type of cyclic prefix. When considering the above-described situation, discussion on a method for determining a resource direction/slot format including uplink, downlink, or flexible symbols need to be made on symbols having diverse lengths by including a normal CP or an extended CP and a slot corresponding to a set of such symbols.

Hereinafter, examples of implementations of the present disclosure will be described in further detail.

When indicating a resource direction to a user equipment (UE), the indication may be made in slot or symbol units. The resource direction may be indicated as downlink (hereinafter referred to as 'D'), uplink (hereinafter referred to as 'U'), and flexible (hereinafter referred to as 'X' or 'F').

In some implementations, the resource direction may be notified to the UE with reference to a normal CP (NCP). However, in some scenarios, the UE may be configured with an extended CP (ECP), rather than NCP, for the downlink or for the uplink. In such scenarios where the UE receives notification of resource directions relative to NCP but is configured with ECP, the UE needs to determine how to define the resource directions corresponding to the ECP environment.

An example of a technique for indicating a resource direction is hereinafter described in detail. In some implementations, such techniques may comply with technical standards 3GPP TS 38.212 and TS 38.213, Rel. 15, the contents of which are incorporated by reference herein. A UE-specific slot format indication (SFI) table, which may be differently combined per UE, may be configured by using a 1-slot unit mother slot format table, for example, as defined in the technical standards TS 38.212 and TS 38.213. Diverse combinations of mother slot format sets are stored in each entry of the table, and, by notifying to the UE an entry index of the UE-specific SFI table that is to be used, the UE recognizes (or acknowledges) the resource direction by using a slot format set included in the entry of the corresponding index.

In some implementations, the UE is also configured with a reference subcarrier spacing (SCS), which is assumed in the UE-specific SFI table, and, since the slot format included in the SFI table is based on the reference SCS, the slot format is applied based on an SCS that is actually being used (i.e., a using SCS). For the slot format that is being applied in this case, if the reference SCS is equal to 15 kilohertz (kHz) and the SCS that is actually being used is equal to 30 kHz, the indicated slot is applied by being extended to 2 times its initial length (or size) (i.e., a direction for one symbol is applied to two symbols).

An NCP reference SCS for the NCP slot format indication and an ECP reference SCS for the ECP slot format indication may be separately defined. Each reference SCS may consider a condition of not being greater (or larger) than the SCS that is actually being used.

The following methods may be implemented as the slot format indication method for the ECP.

Independent Slot Formats for ECP

As one of the slot format indication methods for the ECP, a separate slot format based on the ECP may be defined and indicated. For a UE-specific SFI table, a 1-slot unit mother slot format table may be defined on the ECP and, by using this table, entries of the UE-specific SFI table may be configured of a combination of the corresponding slot formats. For separate slot formats for the ECP, the slot formats may be in accordance with a rule that is presented in the "Slot format change rule," which will be described below in more detail based on the slot format for the NCP, or the corresponding formats may be created independently. Operations of the "Slot format change rule," which will be described further below, correspond to a process that is to be performed by the UE, when the UE receives the NCP-based SF1. In some implementations, the creation of a mother slot format table for the ECP in accordance with the "Slot format change rule," which will be described further below, means that, when defining the mother slot format table for the ECP, the corresponding table is indicated by using the corresponding rule.

When defining independent slot formats for the ECP, it may be notified whether the UE-specific SFI table, which is delivered to the UE through a separate higher layer signaling, is created based on the slot format for the ECP, or whether the table is created based on the slot format for the NCP.

In case the UE is configured with the ECP, and in case the UE-specific SFI table is created based on the slot format for the ECP, the UE may apply the corresponding table without any modification. And, although the UE is configured with the ECP, in case the UE-specific SFI table is created based on the slot format for the NCP, the UE may apply the table by modifying (or changing) the slot format in accordance with a rule that is described in the "Slot format change rule," described below.

Slot Format Change Rule

As another one of the slot format indication methods for the ECP, a slot format change rule to the slot format of the ECP based on the slot format of the NCP may be defined. In other words, only the slot formats of a plurality of NCPs are predefined, and, for the slot format of the ECP, a method of modifying a predefined slot format of the NCP may be considered.

Figure 12:
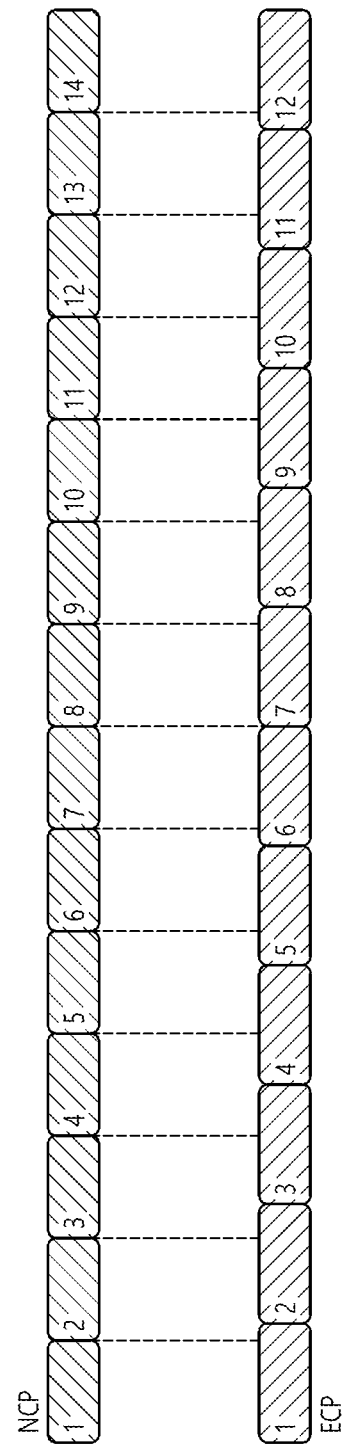
FIG. 12 illustrates an example of a slot having a normal cyclic prefix (CP) and a slot having an extended CP.

FIG. 12 illustrates an example of a slot having a normal CP and a slot having an extended CP.

In the example of FIG. 12, a slot structure of the NCP and a slot structure of the ECP is shown within the same SCS. In a 15 kHz SCS, during 1 millisecond (ms), the NCP is configured of 14 symbols, and the ECP is configured of 12 symbols. Although the number of symbols included in a slot having an NCP and the number of symbols included in a slot having an ECP are different from one another, based on the time axis, the resource directions of the NCP and the ECP may be implemented to be almost similar to one another, so that the surrounding interference influence can be minimized, and so that a gNB can easily maintain the communication.

According to implementations disclosed herein, a rule is defined for the slot format of the ECP based on the slot format of the NCP. As such, in some scenarios, a separate slot format for the ECP may not need to be defined.

Hereinafter, detailed examples of the above-described "Slot format change rule" will be described.

1. Same Reference SCS

A reference SCS of the NCP and a reference SCS of the ECP may be configured to be the same as one another. In such implementations, one slot structure is the same as the slot structure shown in FIG. 12, and it can be seen that symbol number 1 to symbol number 7 of the NCP and symbol number 1 to symbol number 6 of the ECP are accurately aligned. Additionally, symbol number 8 to symbol number 14 of the NCP and symbol number 7 to symbol number 12 of the ECP are also accurately aligned. When a symbol direction of the NCP is applied to a symbol of the ECP, 2 symbols of the NCP are overlapped with 1 symbol of the ECP. Due to such difference in the structure, the relationship between the NCP symbol and the ECP symbol adopting the slot format change rule corresponding to when the direction of two symbols of the NCP are changed (or shifted) to the direction of one ECP symbol may be defined as described below.

As such, in a relationship between slots shown in the example of FIG. 12, a technique of being configured with a slot format for a normal CP (NCP) and applying the configured slot format to a slot having an extended CP (ECP) may be implemented. Herein, a technique of determining a resource direction/format of symbols existing within a slot having an extended CP based on a resource direction/format of symbols existing within a slot having a normal CP that overlap with the symbols existing within the slot having an extended CP along a time axis (e.g., ECP symbol 1 of FIG. 12 is in an overlapping relationship with NCP symbol 1 and NCP symbol 2) may be implemented.

In some implementations, in a relationship between the NCP symbols and the ECP symbols, which will be described below, although it is described that the numbers of the NCP symbols and the ECP symbols start from 1, this is merely exemplary (e.g., the numbers of the NCP symbols and the ECP symbols may also start from 0 or any other suitable starting point).

NCP symbol 1, 2→ECP symbol 1
NCP symbol 2, 3→ECP symbol 2
NCP symbol 3, 4→ECP symbol 3
NCP symbol 4, 5→ECP symbol 4
NCP symbol 5, 6→ECP symbol 5
NCP symbol 6, 7→ECP symbol 6
NCP symbol 8, 9→ECP symbol 7
NCP symbol 9, 10→ECP symbol 8
NCP symbol 10, 11→ECP symbol 9
NCP symbol 11, 12→ECP symbol 10
NCP symbol 12, 13→ECP symbol 11
NCP symbol 13, 14→ECP symbol 12

In some implementations, an ECP symbol may be defined in accordance with a combination of a random NCP symbol x and a random NCP symbol x+1. Herein, as described above, in scenarios where x starts from 0, the x may correspond to 0, 1, 2, 3, 4, 5, 7, 8, 9, 10, 11, 12, and, in scenarios where x starts with 1, the x may correspond to 1, 2, 3, 4, 5, 6, 8, 9, 10, 11, 12, 13. In some implementations, as described above, in the following rules, D refers to a downlink symbol, U refers to an uplink symbol, and X refers to a flexible symbol.

Rule 1: NCP symbol D, D→ECP symbol D
Rule 1-1 option 1: NCP symbol D, X→ECP symbol D
Rule 1-1 option 2: NCP symbol D, X→ECP symbol X
Rule 1-2 option 1: NCP symbol X, D→ECP symbol D
Rule 1-2 option 2: NCP symbol X, D→ECP symbol X
Rule 2: NCP symbol U, U→ECP symbol U
Rule 2-1 option 1: NCP symbol U, X→ECP symbol U
Rule 2-1 option 2: NCP symbol U, X→ECP symbol X
Rule 2-2 option 1: NCP symbol X, U→ECP symbol U
Rule 2-2 option 2: NCP symbol X, U→ECP symbol X
Rule 3 option 1: NCP symbol U, D→D
Rule 3 option 2: NCP symbol U, D→U
Rule 3 option 3: NCP symbol U, D→X
Rule 3 option 4: NCP symbol U, D→error
Rule 4: NCP symbol X, X→X Herein, in case of a rule with options, a particular rule that is to be followed may be configured via higher layer signaling, or the rule may be fixed to one option according to implementations.

Hereinafter, examples in which the slot format change rule is applied will be described.

For example, among the above-described rules, Rule 1, Rule 1-1 option 2, Rule 1-2 option 2, Rule 2, Rule 2-1 option 2, Rule 2-2 option 2, Rule 3 option 3, and Rule 4 may be applied as the slot format change rule. As described above, this may be configured via higher layer signaling, or this may correspond to a fixed configuration.

In this case, if 2 symbols each having an NCP that overlap with one symbol having an ECP are both determined as downlink symbols, or uplink symbols, or flexible symbols, the UE may determine the respective symbol having an ECP as a downlink symbol, or an uplink symbol, or a flexible symbol according to Rule 1, Rule 2, and Rule 4.

Additionally, among the 2 symbols having an NCP, if one of the 2 symbols corresponds to a flexible symbol (more specifically, in case the combination of the 2 symbols having an NCP corresponds to uplink-flexible symbols, flexible-uplink symbols, downlink-flexible symbols, or flexible-downlink symbols), the UE may determine the respective symbol having an ECP as a flexible symbol according to Rule 1-1 option 2, Rule 1-2 option 2, Rule 2-1 option 2, and Rule 2-2 option 2.

Furthermore, in case each of the 2 symbols having an NCP corresponds to uplink symbol and a downlink symbol, the UE may determine the respective symbol having an ECP as a flexible symbol according to Rule 3 option 3.

Figure 13:
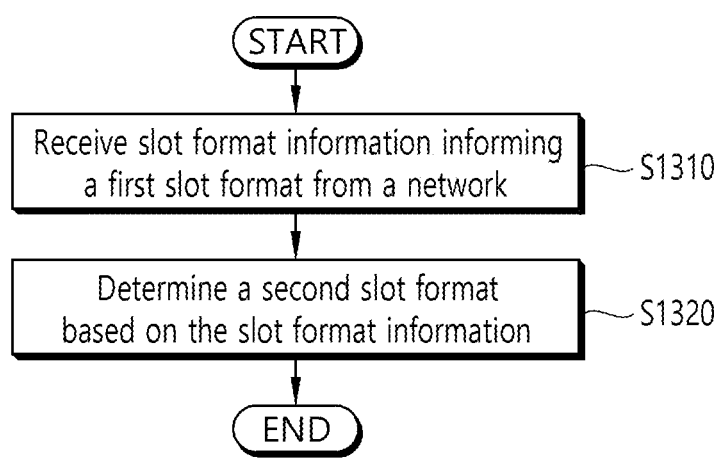
FIG. 13 is a flow chart illustrating an example of determining a slot format of a user equipment (UE) according to some implementations of the present disclosure.

FIG. 13 is a flow chart of an example of determining a slot format of a user equipment (UE) according to some implementations of the present disclosure.

According to the example of FIG. 13, the UE receives, from a network, slot format information informing a first slot format (S1310). Herein, the first slot format may be a slot format for normal symbols each having a normal CP included in a specific time duration. The specific time duration may be, for example, a time duration that is a multiple of a normal symbol duration.

Thereafter, the UE determines a second slot format based on the slot format information (S1320). Herein, the second slot format may be a slot format for extended symbols each having an extended CP included in the specific time duration. The specific time duration may, for example, also be a multiple of an extended symbol duration.

Figure 14:
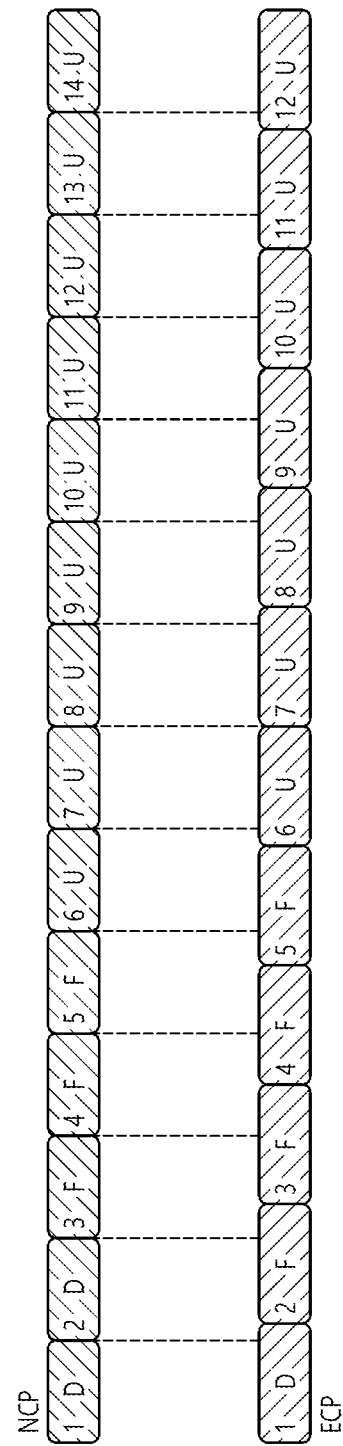
FIG. 14 illustrates an example of determining a slot format of a user equipment (UE) according to some implementations of the present disclosure.

FIG. 14 illustrates an example of determining a slot format of a user equipment (UE) according to some implementations of the present disclosure.

As a detailed example of applying the method for determining a slot format, which is described in the present disclosure with reference to FIG. 14, the UE may receive slot format information including information on a first slot format. And, herein, the first slot format may indicate Format 41 of Table 4, described above. In some implementations, according to Format 41 of Table 4, a first symbol and a second symbol within the slot may each be configured as a downlink symbol, a third symbol to a fifth symbol within the slot may each be configured as a flexible symbol, and a sixth symbol to a fourteenth symbol within the slot may each be configured as an uplink symbol. Herein, as described above, Format 41 may correspond to a format that is based on symbols having a normal CP.

In some implementations, as described above, Rule 1, Rule 1-1 option 2, Rule 1-2 option 2, Rule 2, Rule 2-1 option 2, Rule 2-2 option 2, Rule 3 option 3, and Rule 4 may be applied as the slot format change rule. More specifically, when the UE determines a second slot format based on the slot format information, the UE may determine the second slot format based on Rule 1, Rule 1-1 option 2, Rule 1-2 option 2, Rule 2, Rule 2-1 option 2, Rule 2-2 option 2, Rule 3 option 3, and Rule 4.

In this case, a first extended CP (ECP) symbol may be determined as a downlink symbol according to Rule 1, a second ECP symbol may be determined as a flexible symbol according Rule 1-1 option 2, third and fourth ECP symbols may each be determined as a flexible symbol according to Rule 4, a fifth ECP symbol may be determined as a flexible symbol according to Rule 2-2 option 2, and sixth to twelfth ECP symbols may each be determined as an uplink symbol according to Rule 2.

As the rule, which is described above, is applied, among the symbol directions of the ECP, an X may not exist between D and U. For example, in case NCP 1 to NCP 4 correspond to D, NCP 5 corresponds to X, and NCP 6 and NCP 7 correspond to U, when Rule 1-1 Option 1 and Rule 2-2 Option 1 are applied, the ECP symbol becomes D, D, D, D, U, U. However, in scenario where at least one flexible symbol is implemented for a switching between D and U, then a modified symbol direction of the ECP may be utilized. Therefore, in such scenarios, to avoid the above-described combination, when considering the above-described rule options, the following combinations may be implemented.

Combination 1: Rule 1-1 option 1 & Rule 2-2 option 2 [NCP symbol D, X→ECP symbol D] & [NCP symbol X, U→ECP symbol X]

Combination 2: Rule 1-1 option 2 & Rule 2-2 option 1 [NCP symbol D, X→ECP symbol X] & [NCP symbol X, U ECP symbol U]

Among the above-described combinations, a specific combination that is to be used may be configured for a UE via higher layer signaling, or one combination may be fixed for usage. Alternatively, according to the rule, in case U immediately follows a D symbol/slot, it may be assumed that one D symbol is changed (or modified) to X before the U is started.

2. Other SCS

When the reference SCS of the NCP is smaller than the reference SCS of the ECP, a time duration of the NCP slot is larger than a time duration of the ECP. Accordingly, the ECP symbol may exist within the NCP symbol, or part of the ECP symbol may be overlapped with two NCP symbols. The direction of the ECP symbol existing within the NCP symbol may directly follow the NCP symbol. And, in case of the ECP symbol being positioned over two NCP symbols, the symbol direction may be defined in accordance with the rule that is defined in the above-described scenario of "1. Same reference SCS."

Figure 15:
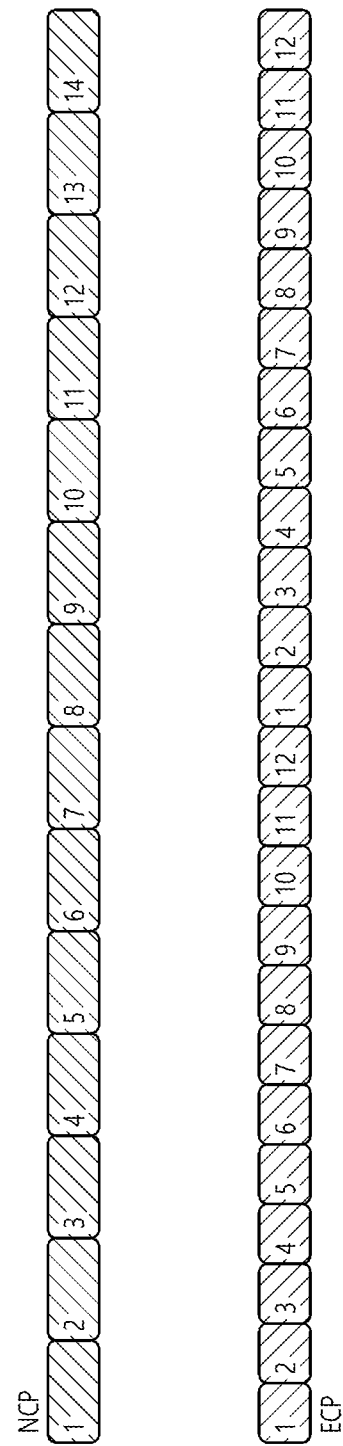
FIG. 15 illustrates an example of a slot structure corresponding to a case where a reference SCS of an ECP is 2 times larger than a reference SCS of an NCP.

FIG. 15 illustrates an example of a slot structure corresponding to a case where a reference SCS of an ECP is 2 times larger than a reference SCS of an NCP, according to some implementations of the present disclosure. Herein, for example, the reference SCS of an NCP may be equal to 30 kHz, and the reference SCS of an ECP may be equal to 60 kHz.

According to the example of FIG. 15, ECP symbol 1 exists within NCP symbol 1, and ECP symbol 2 overlaps with NCP symbol 1 and NCP symbol 2. Additionally, ECP symbol 3 exists within NCP symbol 2, and ECP symbol 4 overlaps with NCP symbol 2 and NCP symbol 3. Additionally ECP symbol 5 exists within NCP symbol 3, and ECP symbol 6 overlaps with NCP symbol 3 and NCP symbol 4. By using the same method, in case the reference SCS of the ECP is larger than the reference SCS of the NCP, ECP symbols overlapping with multiple NCP symbols and ECP symbols existing within one NCP symbol may exist.

Herein, when the UE, which has received the slot format for NCP symbols, determines a slot format for the ECP symbols, for the ECP symbols being included in the NCP symbols, the resource direction of the corresponding NCP symbol may be directly applied without any modification. And, for the ECP symbols overlapping with multiple NCP symbols, the format of the corresponding ECP symbol may be determined by applying the above-described slot format change rule. More specifically, for example, since ECP symbol 1 of FIG. 15 corresponds to a symbol existing within NCP symbol 1, the format of NCP symbol 1 may be directly applied. And, since ECP symbol 2 corresponds to a symbol overlapping with NCP symbol 1 and NCP symbol 2, the format of ECP symbol 2 may be determined by applying the above-described slot format change rule.

On the other hand, in case the reference SCS of the NCP is larger than the reference SCS of the ECP, multiple NCP symbols may be positioned within the time duration of one ECP symbol. For example, a case where the reference SCS of the NCP is 2 times the size of the reference SCS of the ECP may be considered.

Figure 16:
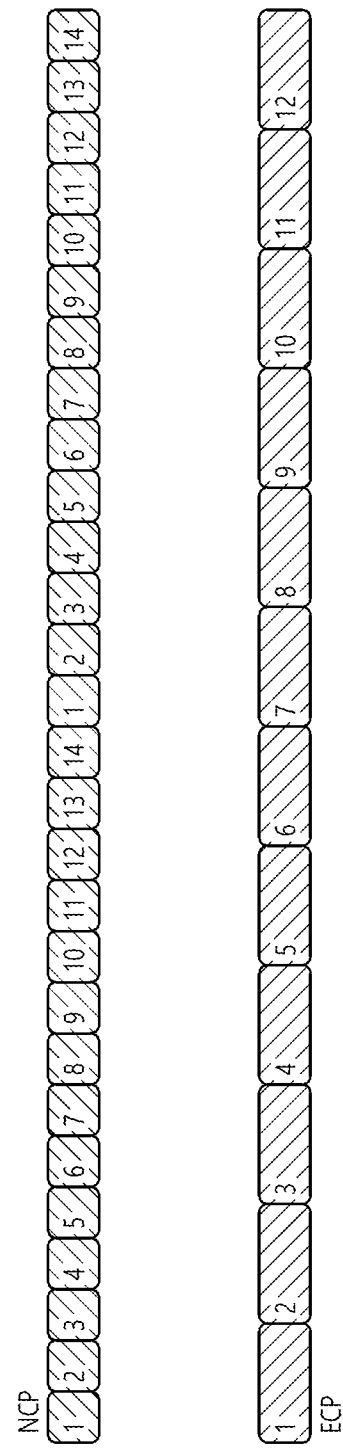
FIG. 16 illustrates an example of a slot structure corresponding to a case where a reference SCS of an NCP is 2 times larger than a reference SCS of an ECP.

FIG. 16 illustrates an example of a slot structure corresponding to a case where a reference SCS of an NCP is 2 times larger than a reference SCS of an ECP, according to implementations of the present disclosure. Herein, for example, the reference SCS of an NCP may be equal to 30 kHz, and the reference SCS of an ECP may be equal to 15 kHz.

According to the example of FIG. 16, ECP symbol 1 overlaps with NCP symbols 1 to 3, ECP symbol 2 overlaps with NCP symbols 3 to 5, ECP symbol 3 overlaps with NCP symbols 5 to 7, ECP symbol 4 overlaps with NCP symbols 8 to 10, ECP symbol 5 overlaps with NCP symbols 10 to 12, and ECP symbol 6 overlaps with NCP symbols 12 to 14. Additionally, for ECP symbols 7 to 12, the same overlapping structure of ECP symbols 1 to 6 is applied.

In this case, 3 NCP symbols (including the partially overlapping symbol(s)) may be included in the time duration of one ECP symbol. In this case, the corresponding rule may be defined as described below.

Rule 1: NCP symbol D, D, D→ECP symbol D
Rule 1-1 option 1: NCP symbol D, D, X→ECP symbol D
Rule 1-1 option 2: NCP symbol D, D, X→ECP symbol X
Rule 1-2 option 1: NCP symbol D, X, X→ECP symbol D
Rule 1-2 option 2: NCP symbol D, X, X→ECP symbol X
Rule 1-3 option 1: NCP symbol X, X, D→ECP symbol D
Rule 1-3 option 2: NCP symbol X, X, D→ECP symbol X
Rule 1-4 option 1: NCP symbol X, D, D→ECP symbol D
Rule 1-4 option 2: NCP symbol X, D, D→ECP symbol X
Rule 2: NCP symbol U, U, U→ECP symbol U
Rule 2-1 option 1: NCP symbol U, U, X→ECP symbol U
Rule 2-1 option 2: NCP symbol U, U, X→ECP symbol X
Rule 2-2 option 1: NCP symbol U, X, X→ECP symbol U
Rule 2-2 option 2: NCP symbol U, X, X→ECP symbol X
Rule 2-3 option 1: NCP symbol X, X, U→ECP symbol U
Rule 2-3 option 2: NCP symbol X, X, U→ECP symbol X
Rule 2-4 option 1: NCP symbol X, U, U→ECP symbol U
Rule 2-4 option 2: NCP symbol X, U, U→ECP symbol X
Rule 3: NCP symbol D, X, U→ECP symbol X
Rule 4: NCP symbol X, X, X→ECP symbol X As the rule, which is described above, is applied, among the symbol directions of the ECP, an X may not exist between D and U. In scenarios where at least one flexible symbol is implemented for a switching between D and U, a combination of rule options may be implemented. Herein, the possible combinations may be as described below.

Rule 1-1 option 1 & [Rule 2-3 option 2 or Rule 2-4 option 2]

Rule 1-2 option 1 & [Rule 2-3 option 2 or Rule 2-4 option 2]

Rule 1-1 option 2 & [Rule 2-3 option 1 or Rule 2-4 option 1]

Rule 1-2 option 2 & [Rule 2-3 option 1 or Rule 2-4 option 1]

Alternatively, as described above, at least one D symbol may be changed to X before the U symbol/slot is started.

In some implementations, among the above-described combinations, a specific combination that is to be used may be configured to a UE via higher layer signaling, or one combination may be fixed for usage.

Additionally, for example, reference SCS restriction may be considered.

In case the reference SCS of the NCP is larger than the reference SCS of the ECP, the indicated time duration may be configured to be equal to a multiple of the time duration of at least 1 slot of the reference SCS of the ECP.

3. Time Duration for SFI Restriction

When the slot format is changed to the slot format of the ECP by using one slot format based on the NCP, in case of giving an SFI based on the NCP, the SFI may be given for a number of slots corresponding to a multiple of 0.5 ms. For example, in the 15 kHz SCS, since the slots of the NCP and the ECP are aligned at an interval of 0.5 ms, if the NCP-based SFI is notified according to 0.5 ms, when the SFI is changed to the SFI of the ECP, an alignment between the slot structure and the time duration of the ECP may be easily carried out.

Figure 17:
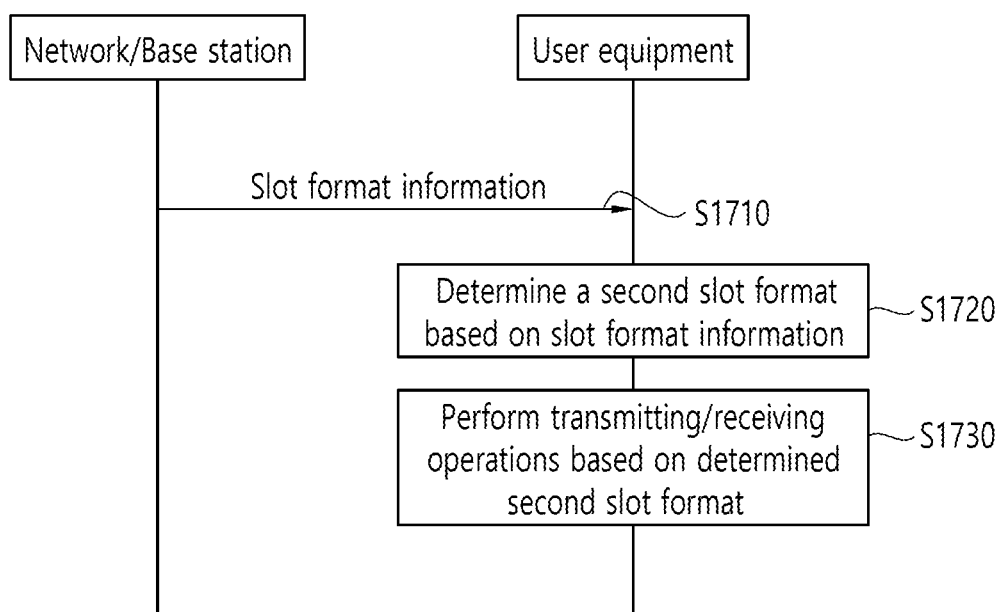
FIG. 17 is a flow chart showing an example of determining a slot format of a user equipment (UE) according to some implementations of the present disclosure.

FIG. 17 illustrates a flow chart showing an example of determining a slot format of a user equipment (UE) according to some implementations of the present disclosure.

According to the example of FIG. 17, a network or base station transmits a first slot format informing slot format information to the UE (S1710). Herein, the first slot format may be a slot format for normal symbols each having a normal CP being included in a specific time duration. The specific time duration may be, for example, a time duration that is a multiple of an NCP symbol duration.

Subsequently, the UE determines a second slot format based on the slot format information (S1720). Herein, the second slot format may be a slot format for extended symbols each having an extended CP being included in the specific time duration. The specific time duration may, for example, also be a multiple of an ECP symbol duration.

Herein, for example, the above-described slot format change rule may be applied when determining the second slot format. Additionally, herein, the normal CP based reference SCS and the extended CP based reference SCS may be different from one another. In this case, the above-described methods may be used for the configuration of the slot formats. Since the corresponding examples are the same as the above-described examples, detailed description of the same will be omitted for simplicity.

Thereafter, the UE may perform transmitting and/or receiving operations based on the determined second slot format (S1730).

<Slot Format Indication According to the CP Mode Configuration of each D & U>

For the UE, the CP mode of the uplink and the CP mode of the downlink may be the same or may be different.

In scenarios where the CP mode of the uplink and the CP mode of the downlink are the same, then according to some implementations, the slot format may be indicated as described below.

Option 1: An SFI is notified based on a mother slot format that is appropriate for the CP mode.

Option 2: Since only the mother slot format for the NCP mode is defined, both the downlink and the uplink apply the slot format change rule for the ECP.

In scenarios where the CP mode of the uplink and the CP mode of the downlink are different, then according to some implementations, an SFI is notified based on a mother slot format of the NCP mode, and the slot format change rule may be applied only for a downlink/uplink corresponding to the ECP.

For example, in case a normal CP is configured for the downlink and an extended CP is configured for the uplink, the UE may determine a slot format for the uplink based on the slot format information for the downlink. As described above, the slot format information for the downlink may include information regarding the normal CP based slot format. Also, the slot format for the uplink may be determined based on the above-described slot format change rule.

Hereinafter, an example of resource configurations with RRC in a semi-static D/U assignment will be described in detail.

The semi-static D/U assignment may be configured as one cycle period having one D-X-U structure, or the semi-static D/U assignment may be configured to have a long cycle period, which is configured of a combination of two short cycle periods having two D-X-U structures. More specifically, cycle periods X ms and Y ms are defined, and a semi-static D/U assignment having a long cycle period, which is configured of (X+Y) ms, may be carried out.

Apart from the semi-static D/U assignment, RRC configurations, such as periodic CSI measurement, periodic CSI reporting, UE-specific RACH resource configuration, Grant-free resource configuration, and so on, may be delivered to the UE.

Such RRC configuration may determine whether or not the UE is to be actually operated by the semi-static D/U assignment. Accordingly, when such RRC configuration is set, in scenarios where the semi-static D/U assignment is configured to have a cycle period having one D-X-U structure, since only the corresponding cycle period needs to be considered, no problem occurs. However, in scenarios where the semi-static D/U assignment is configured to have one long cycle period, which is configured of a combination of two short cycle periods having two D-X-U structures, ambiguity may exist in carrying out the RRC configuration based on which specific cycle period, As such, the following options may be implemented.

Option 1: The RRC configuration may be set to fit (or match) each short cycle period of the semi-static D/U assignment. More specifically, for example, two RRC configurations respectively matching two short cycle periods are defined, and each RRC configuration may be applied within each of the corresponding cycle period.

Option 2: The RRC configuration may be set to fit (or match) one long semi-static cycle period, which is configured of two short cycle periods. As compared to Option 1, since the configuration is not set to match the two short cycle periods, it may be difficult to accurately match the RRC configuration with the semi-static D/U assignment. However, this option is advantageous in that only one configuration may be set.

Option 3: A unique RRC configuration cycle period may be defined and set regardless of the cycle period of the semi-static D/U assignment.

Figure 18:
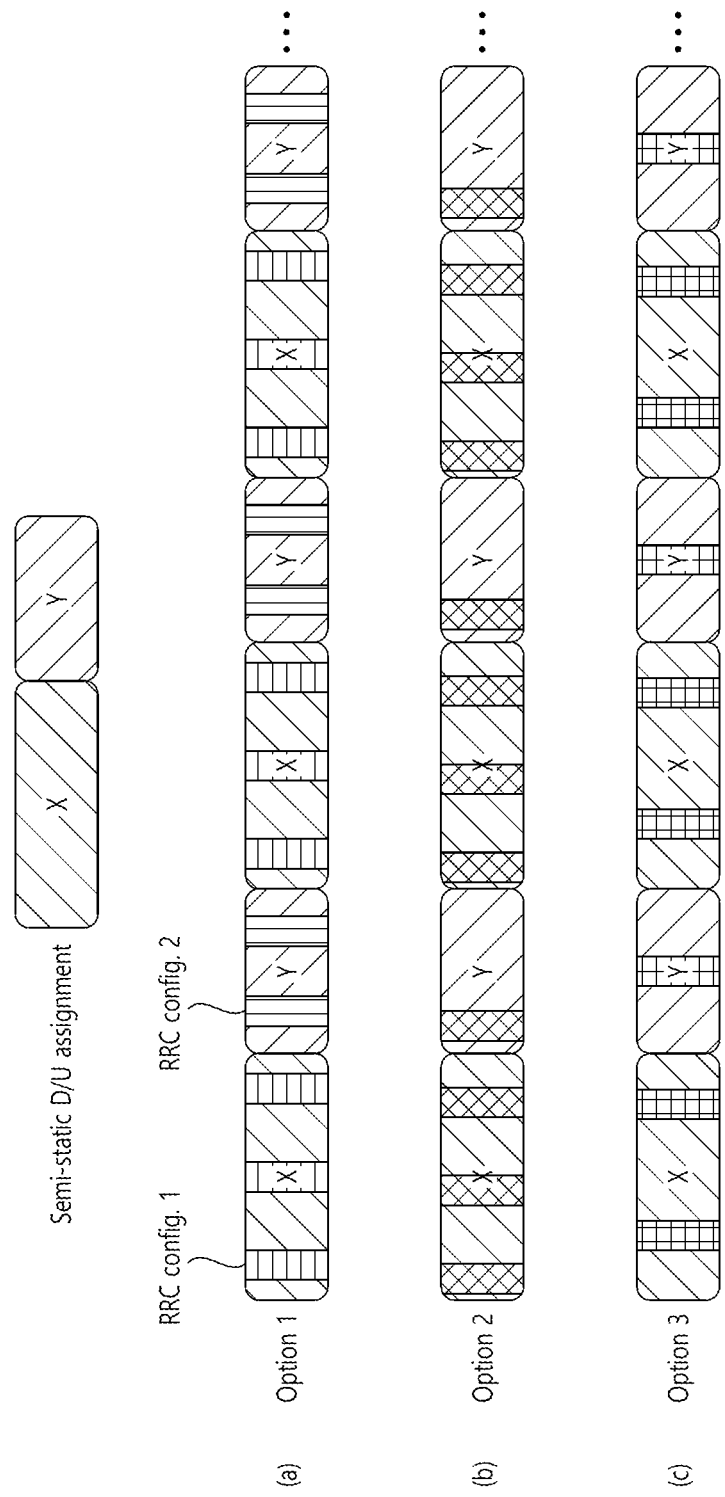
FIG. 18 illustrates an example of an RRC configuration of a semi-static D/U assignment that merges two cycle periods, according to some implementations of the present disclosure.

FIG. 18 illustrates an example of an RRC configuration of a semi-static D/U assignment that merges two cycle periods, according to some implementations.

Examples (a), (b), and (c) of FIG. 18 respectively illustrate examples of applying option 1, option 2, and option 3. Herein, the semi-static D/U assignment has a cycle period of X+Y.

Example (a) of FIG. 18 shows an example, wherein RRC configuration 1 is configured to have a cycle period X and RRC configuration 2 is configured to have a cycle period Y. More specifically, 2 RRC configurations are defined, and a separate cycle period (X and Y) is defined for each RRC configuration, and a sum of the separate cycle periods corresponding to each RRC configuration is equal to a total cycle period (X+Y) of all RRC configurations. Herein, during the total cycle period (X+Y), RRC configuration 1 and RRC configuration 2 are separately applied.

Example (b) of FIG. 18 shows an example, wherein the RRC configuration is configured to have a cycle period of X+Y, which is the same as the cycle period of the semi-static D/U assignment. More specifically, for exmaple, one RRC configuration has a cycle period of X+Y, which is equivalent to the cycle period of the semi-static D/U assignment.

According to example (c) of FIG. 18, the cycle period of the RRC configuration may be configured independently from the cycle period of the semi-static D/U assignment.

As described above, according to some implementations of the present disclosure, provided herein is a method for configuring a resource direction/slot format for a symbol and a slot enabling scheduling that may provide improved flexibility.

Since the examples of the above-described technique may also be included as one of the implementations of the present disclosure, it will be apparent that the corresponding examples may be viewed as other types of techniques. Additionally, although the above-described techniques may be implemented independently, a combination (or merging) of parts of the techniques may also be implemented. For example, a rule may be defined for notifying information on whether or not the techniques are applied (or information on the rules for the techniques), by a base station, to a user equipment (UE) by using a pre-defined signal (e.g., a physical layer signal or a higher layer signal).

Figure 19:
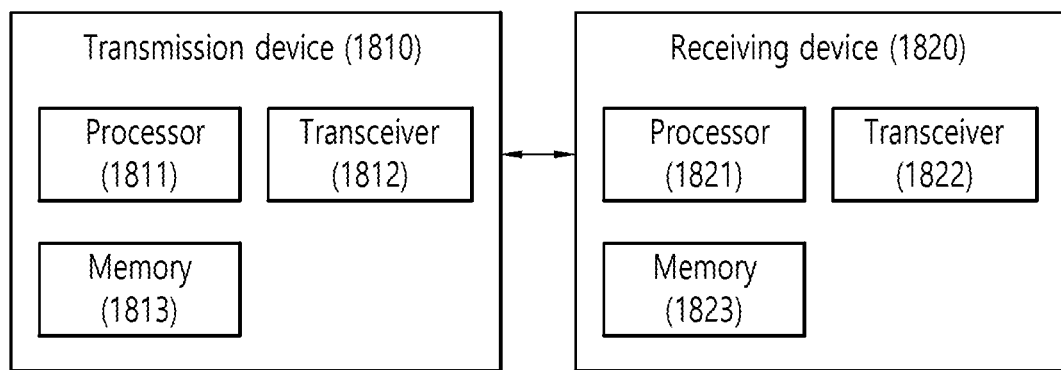
FIG. 19 is a block diagram showing an example of components of a transmitting device and a receiving device according to some implementations of the present disclosure.

FIG. 19 is a block diagram showing an example of components of a transmitting device and a receiving device according to some implementations of the present disclosure. Here, the transmitting device and the receiving device may be a base station and a terminal.

In this example, the transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of implementations of the present disclosure.

The memories 18113 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and 1821 or stored in the memories 1813 and 1823 and executed by the processors 1811 and 1821.

The at least one processor 1811 of the transmitting device 1810 can perform predetermined coding and modulation on a signal and/or data to be transmitted to the outside and then transmit the signal and/or data to the transceiver 1812. For example, the at least one processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the at least one processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The at least one processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an implementation of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 20:
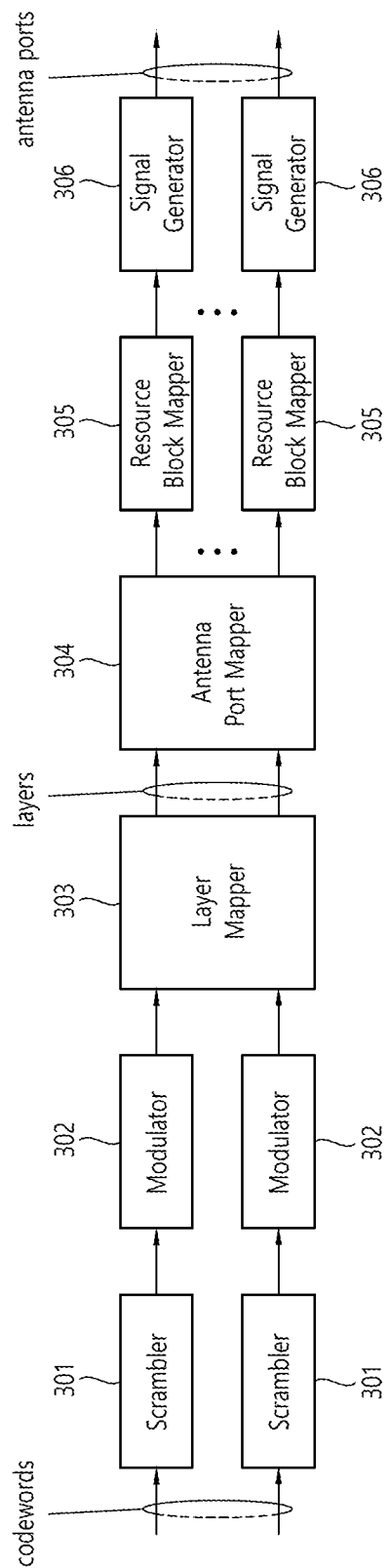
FIG. 20 illustrates an example of a signal processing module structure in a transmitting device, according to some implementations of the present disclosure.

FIG. 20 illustrates an example of a signal processing module structure in a transmitting device, such as transmitting device 1810 of FIG. 19. Here, signal processing can be performed by a processor of a base station/terminal, such as the processors 1811 and 1821 of FIG. 19.

Referring to the example of FIG. 20, the transmitting device included in a terminal or a base station may include scramblers 301, modulators 302, a layer mapper 303, an antenna port mapper 304, resource block mappers 305 and signal generators 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 21:
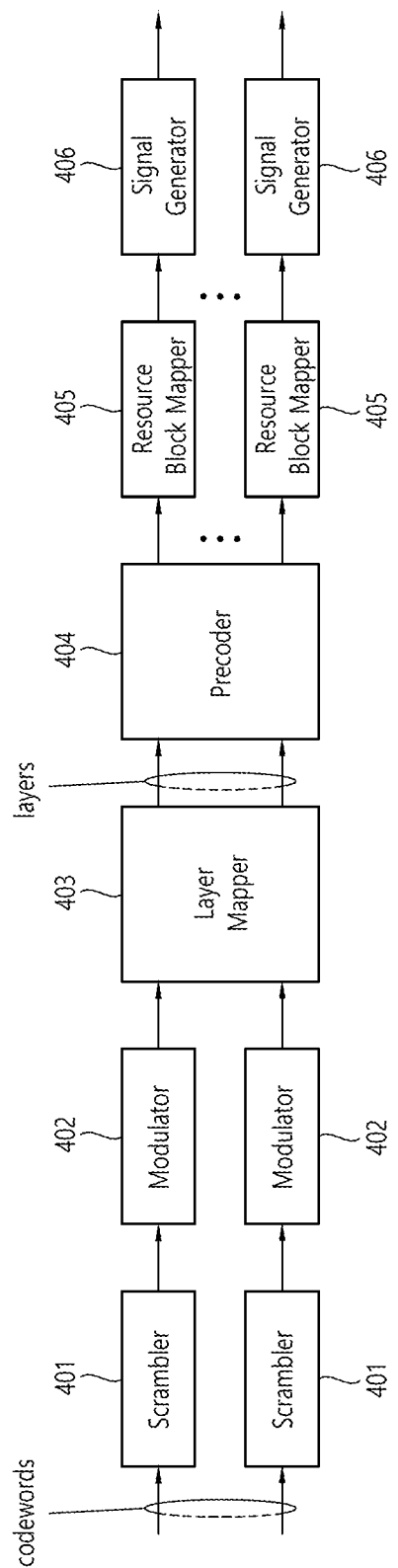
FIG. 21 illustrates another example of a signal processing module structure in a transmitting device, according to some implementations of the present disclosure.

FIG. 21 illustrates another example of the signal processing module structure in a transmitting device, such as transmitting device 1810 of FIG. 19. Here, signal processing can be performed by a processor of a terminal/base station, such as the processors 1811 and 1821 of FIG. 19.

Referring to FIG. 21, the transmitting device included in a terminal or a base station may include scramblers 401, modulators 402, a layer mapper 403, a precoder 404, resource block mappers 405 and signal generators 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of a receiving device (e.g., receiving device 1820 of FIG. 19) may be the reverse to the signal processing procedure of the transmitting device. Specifically, referring back to the example of FIG. 19, the at least one processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 22:
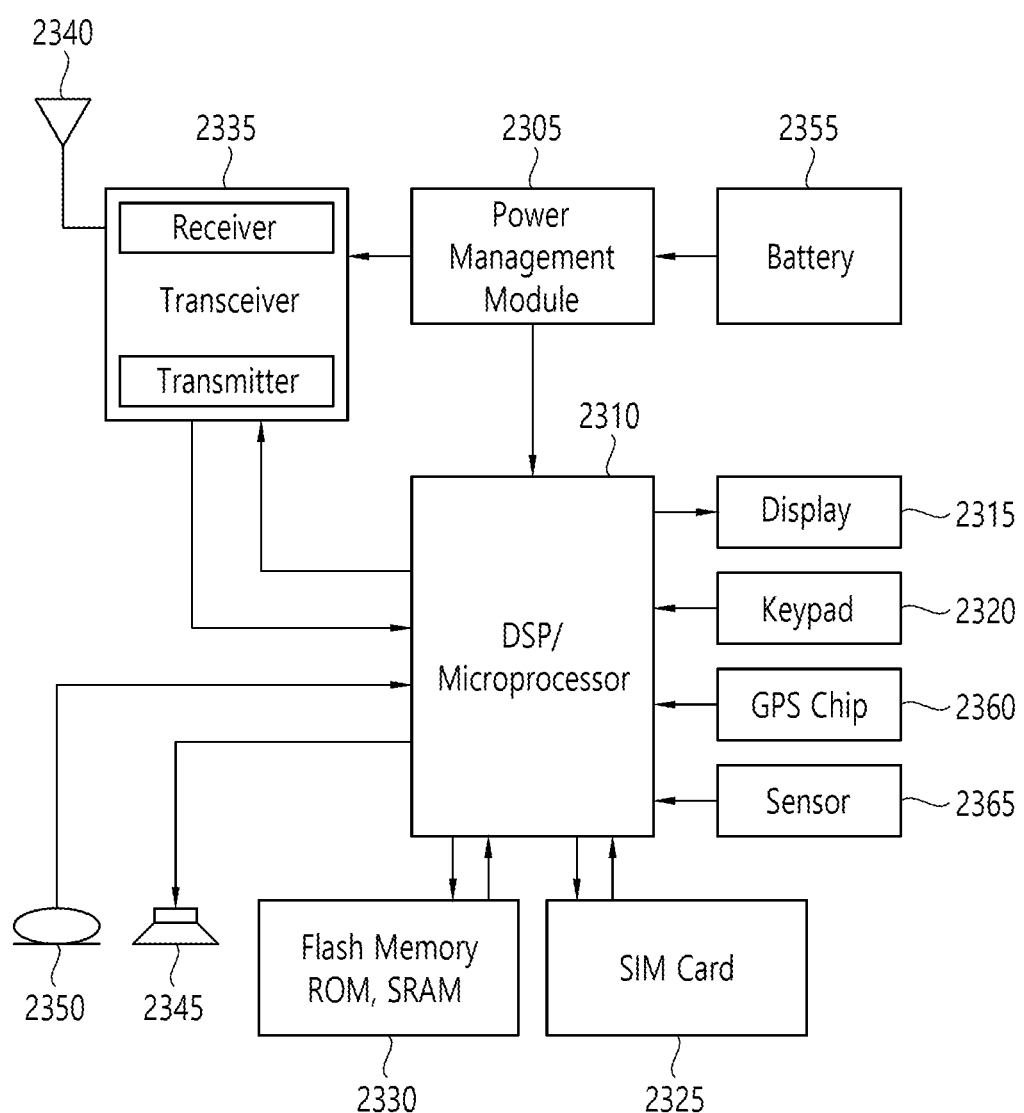
FIG. 22 illustrates an example of a wireless communication device according to some implementations of the present disclosure.

FIG. 22 illustrates an example of a wireless communication device according to some implementations of the present disclosure.

Referring to the example of FIG. 22, the wireless communication device, for example, a terminal may include at least one of at least one processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, at least one memory 2330, a subscriber identification module (SIM) card 2325, a speaker 2345 and a microphone 2350. A plurality of antennas and a plurality of processors may be provided.

The at least one processor 2310 can implement functions, procedures and methods described in the present disclosure. The at least one processor 2310 in FIG. 22 may, for example, implement the processors 1811 and 1821 in FIG. 19.

The at least one memory 2330 is connected to the at least one processor 2310 and stores information related to operations of the processor. The memory may be located inside or outside the processor and connected to the processor through various techniques such as wired connection and wireless connection. The at least one memory 2330 in FIG. 22 may, for example, implement the memories 1813 and 1823 in FIG. 19.

A user can input various types of information such as telephone numbers using various techniques such as pressing buttons of the keypad 2320 or activating sound using the microphone 2350. The at least one processor 2310 can receive and process user information and execute an appropriate function such as calling using an input telephone number. In some scenarios, data can be retrieved from the SIM card 2325 or the at least one memory 2330 to execute appropriate functions. In some scenarios, the at least one processor 2310 can display various types of information and data on the display 2315 for user convenience.

The transceiver 2335 is connected to the at least one processor 2310 and transmit and/or receive RF signals. The at least one processor 2310 can control the transceiver 2335 in order to start communication or to transmit RF signals including various types of information or data such as voice communication data. The transceiver 2335 may include a transmitter and a receiver for transmitting and receiving RF signals. The antenna 2340 can facilitate transmission and reception of RF signals. In some implementation examples, when the transceiver 2335 receives an RF signal, the transceiver 2335 can forward and convert the signal into a baseband frequency for processing performed by the at least one processor 2310. The signal can be processed through various techniques such as converting into audible or readable information to be output through the speaker 2345. The transceiver 2335 in FIG. 22 may, for example, implement the transceivers 1812 and 1822 in FIG. 19.

In some implementations, in FIG. 22, various components such as a camera and a universal serial bus (USB) port may be additionally included in the terminal. For example, the camera may be connected to the at least one processor 2310.

FIG. 22 is merely an example of implementations with respect to the terminal, and implementations of the present disclosure are not limited thereto. For example, a terminal need not necessarily include all the components shown in FIG. 21. That is, some of the components, for example, the keypad 2320, the GPS chip 2360, the sensor 2365 and the SIM card 2325 may not be implemented in some scenarios. In this case, they may not be included in the terminal.

What is claimed is:

1. A method for determining a slot format in a wireless communication system, the method performed by a user equipment (UE) and comprising:
   receiving, from a network, slot format information informing a first slot format for a plurality of normal symbols in a time duration, wherein each of the plurality of normal symbols includes a normal cyclic prefix (CP), and
   determining a second slot format for a plurality of extended symbols in the time duration based on the slot format information, wherein each of the plurality of extended symbols includes an extended CP,
   wherein a first subcarrier spacing (SCS) for the plurality of normal symbols is smaller than a second SCS for the plurality of extended symbols, where each of the plurality of normal symbol is longer than each of the plurality of extended symbols in a time domain,
   wherein based on an extended symbol of the plurality of extended symbols being overlapped with two normal symbols of the plurality of normal symbols in a time domain, the extended symbol is determined as a downlink symbol, an uplink symbol or a flexible symbol based on each of the two normal symbols being a downlink symbol, an uplink symbol or a flexible symbol,
   wherein based on the extended symbol being overlapped with a first normal symbol which is the downlink symbol and a second normal symbol which is the uplink symbol in a time domain, the extended symbol is determined as the flexible symbol, and
   wherein based on a specific extended symbol of the plurality of extended symbols being totally included in a normal symbol of the plurality of normal symbols in a time domain, a symbol type of the specific extended symbol is determined as a symbol type of the normal symbol.

2. The method of claim 1, wherein the first slot format informs that each of the plurality of normal symbols is the downlink symbol, the uplink symbol or the flexible symbol.

3. The method of claim 1, wherein the second slot format informs that each of the plurality of extended symbols is the downlink symbol, the uplink symbol or the flexible symbol.

4. The method of claim 1, wherein based on both of the two normal symbols being the downlink symbol, the uplink symbol or the flexible symbol, the extended symbol is determines as the downlink symbol, the uplink symbol or the flexible symbol.

5. The method of claim 1, wherein based on at least one of the two normal symbols being the flexible symbol, the flexible symbol is determined as the flexible symbol.

6. The method of claim 1, wherein the first slot format is one of a plurality of predetermined first slot formats.

7. A user equipment (UE), comprising:
- a transceiver; and
- at least one processor, and
- at least one computer memory operably connectable to the at least one processor and storing instructions that, when executed by the at least one processor, perform operations comprising:
- receiving, from a network, slot format information informing a first slot format for a plurality of normal symbols in a time duration, wherein each of the plurality of normal symbols includes a normal cyclic prefix (CP), and
- determining a second slot format for a plurality of extended symbols in the time duration based on the slot format information, wherein each of the plurality of extended symbols includes an extended CP,
- wherein a first subcarrier spacing (SCS) for the plurality of normal symbols is smaller than a second SCS for the plurality of extended symbols, where each of the plurality of normal symbol is longer than each of the plurality of extended symbols in a time domain,
- wherein based on an extended symbol of the plurality of extended symbols being overlapped with two normal symbols of the plurality of normal symbols in a time domain, the extended symbol is determined as a downlink symbol, an uplink symbol or a flexible symbol based on each of the two normal symbols being a downlink symbol, an uplink symbol or a flexible symbol,
- wherein based on the extended symbol being overlapped with a first normal symbol which is the downlink symbol and a second normal symbol which is the uplink symbol in a time domain, the extended symbol is determined as the flexible symbol, and
- wherein based on a specific extended symbol of the plurality of extended symbols being totally included in a normal symbol of the plurality of normal symbols in a time domain, a symbol type of the specific extended symbol is determined as a symbol type of the normal symbol.

8. The UE of claim 7, wherein the first slot format informs that each of the plurality of normal symbols is the downlink symbol, the uplink symbol or the flexible symbol.

9. The UE of claim 7, wherein the second slot format informs that each of the plurality of extended symbols is the downlink symbol, the uplink symbol or the flexible symbol.

10. The UE of claim 7, wherein based on both of the two normal symbols being the downlink symbol, the uplink symbol or the flexible symbol, the extended symbol is determines as the downlink symbol, the uplink symbol or the flexible symbol.

11. The UE of claim 7, wherein based on at least one of the two normal symbols being the flexible symbol, the flexible symbol is determined as the flexible symbol.

12. The UE of claim 7, wherein the first slot format is one of a plurality of predetermined first slot formats.

* * * * *